United States Patent [19]
Miwa et al.

[11] Patent Number: 5,528,348
[45] Date of Patent: Jun. 18, 1996

[54] DAMPING DEVICE FOR ROTATING MEMBERS

[75] Inventors: Tadashi Miwa; Toru Makino; Ken Nonaka, all of Hachioji, Japan

[73] Assignee: Konica Corporation, Japan

[21] Appl. No.: 283,041

[22] Filed: Jul. 29, 1994

Related U.S. Application Data

[63] Continuation-in-part of Ser. No. 58,974, May 6, 1993.

[30] Foreign Application Priority Data

| Sep. 11, 1992 | [JP] | Japan | 4-269409 |
| Sep. 14, 1992 | [JP] | Japan | 4-271108 |
| Sep. 14, 1992 | [JP] | Japan | 4-271110 |

[51] Int. Cl.$^6$ .................................................. G03G 15/00
[52] U.S. Cl. ........................... 355/211; 355/200; 74/574
[58] Field of Search .............................. 355/211, 200, 355/210; 492/15; 74/572, 574

[56] References Cited

U.S. PATENT DOCUMENTS 4,935,778 6/1990 Mochida ................... 355/211

FOREIGN PATENT DOCUMENTS

| 57-151955 | 9/1982 | Japan | 355/211 |
| 58-120265 | 7/1983 | Japan | 355/211 |
| 61-130967 | 6/1986 | Japan | 355/211 |
| 63-155169 | 6/1988 | Japan | 355/211 |
| 1-231065 | 9/1989 | Japan | 355/211 |
| 1-282567 | 11/1989 | Japan | 355/211 |
| 2-115861 | 4/1990 | Japan | 355/211 |
| 2-184868 | 7/1990 | Japan | 355/211 |
| 2-282271 | 11/1990 | Japan | 355/211 |
| 3-84564 | 4/1991 | Japan | 355/211 |
| 4-75065 | 3/1992 | Japan | 355/211 |

*Primary Examiner*—R. L. Moses
*Attorney, Agent, or Firm*—Bierman and Muserlian

[57] ABSTRACT

A proper frequency of a driving system is shifted to a high frequency side by increasing the rigidity of a photoreceptor drum or the proper frequency of the driving system is shifted to a low frequency side by reducing the rigidity of the photoreceptor drum so that the proper frequency of the driving system is made so as not to conform with a frequency of a speed fluctuation component transmitted to the driving system. With this construction, the photoreceptor drum is prevented from causing the resonance and the speed fluctuation is reduced so that an image quality can be improved.

11 Claims, 26 Drawing Sheets

DAMPING DEVICE FOR ROTATING MEMBERS

This application is a continuation-in-part, of application Ser. No. 08/058,974, filed May 6, 1993.

BACKGROUND OF THE INVENTION

The present invention relates to an image forming output apparatus such as a digital color copying apparatus, a digital color printer, and the like to which an electrophotographic process is applied.

In a copying apparatus or printer to which an electrophotographic process is applied, an image is formed in the following manner: a rotating cylindrical photoreceptor or a belt-shaped photoreceptor is rotated and electrostatic latent images are formed thereon successively; black toner and other color toners, in the case of color image formation, are adhered to the electrostatic latent images formed as described above for development; and they are transferred onto a recording sheet, thus, the image is obtained. In this specification, the photoreceptor drum in the image output apparatus and a driving roller for the belt-shaped photoreceptor are referred to as a rotational body. When the rotational speed of the photoreceptor drum is varied for some reasons, jittering or an uneven image is caused in the outputted image. These phenomena have remarkably appeared especially in the digital system electrophotographic technology employing scanning by means of a semiconductor laser for writing images on a photoreceptor. Fluctuation in rotational speed of the photoreceptor has caused speed fluctuation of a writing system in the subsidiary scanning direction to create a slight variation in the distance between writing lines, contributing to the remarkable deteriorations of the image quality.

Conventionally, when designing the driving system for use in a copying apparatus or a printer, the main consideration is that the objects driven by the driving device are appropriately located in the allowable space, while satisfying the values of the line speed or number of revolutions introduced from the product specification. That is, the following are main concerns: the method by which the driving power is transmitted from a driving power source to a driven object; and mechanical elements for power transmission. Accordingly, when jittering and rotational fluctuation are caused in the product, the cause is investigated, and one or more of the following countermeasures are considered: a bearing of a drive shaft of the photoreceptor is replaced with one made of sintered metal; a flywheel is connected with the drive shaft of the photoreceptor; a brake, in which a spring is combined with a friction material, is provided on the rotary shaft of the photoreceptor drum; the accuracy of a gear is enhanced; or a helical gear with various kinds of torsion angles is provided.

However, in the development of a digital type image output apparatus, strict reproducibility of a one dot line written by a laser beam is required with an improvement of the apparatus performance, and accuracy required on the driving system has rapidly become strict. The accuracy required is a level at which the uniformity of laser writing in the subsidiary scanning direction is assured in relation to the visible sensitivity of the visual system. In order to accomplish this accuracy, it is mostly necessary to make the photoreceptor driving system highly accurate. The main factor of the rotational fluctuation of the driving system is the following: the rotational fluctuation per one rotation of the rotating shaft of a motor is large, and absolute values of fluctuation components per one rotation of a gear and per one tooth of a gear are large; and fluctuation components and their higher harmonic wave components cause a resonance phenomenon in relation to the proper oscillation frequency of the driving system.

FIG. 10 shows the power spectrum of speed fluctuation of conventional apparatuses. In FIG. 10, fluctuation components of a gear according to the line speed proper to the apparatus are 176 Hz in the case of a gear directly coupled to the motor, 64 Hz in the case of a second shaft, and 25 Hz in the case of a gear directly coupled to a drum, and in this case, a higher harmonic wave component of 50 Hz is shown. Further, a component of a rotation of the gear directly coupled to the motor is 22 Hz, and its higher harmonic wave component of 44 Hz is shown in the drawing.

In FIG. 11, an example is shown in which the transfer function has been measured in order to numerically obtain the proper oscillation frequency of the driving system. In this case, the measurement has been conducted in the following way: an output of an impact excitation hummer, and an output of a piezoelectric type pick-up sensor, provided to one end of a photoreceptor drum in order to measure the fluctuation of the acceleration in the rotation direction, are connected with a dual channel type FFT analyzer; and a Fourier spectrum ratio is obtained. From FIG. 11, the following can be found: a peak of the proper oscillation frequency is near 45 Hz; and high level areas of the transfer function are spread near the range of 30 to 60 Hz.

FIG. 12 shows superimposition of the fluctuation component spectrum and the transfer function. In the driving system, it can be found from the drawing that a peak of the transfer function and the position of a frequency area, to which the fluctuation component and its second harmonics belong, are superimposed. That is, it is found that the driving system amplifies the fluctuation components (resonance is caused).

Actually, when data measured from three apparatuses having the different driving systems were investigated, the fluctuation of rotation of the photoreceptor was 5 to 8%.

SUMMARY OF THE INVENTION

In order to solve the forgoing problems, in the present invention, decreasing the speed fluctuation of a motor and a gear is accepted as a precondition. Further, in addition to that, the present invention aims at the transmission of the fluctuation component in the driving power transmission system, and the concept of the transfer function, resonance and proper oscillation is incorporated in the invention. Further, how the transmitted fluctuation can be decreased is considered in the present invention, and the driving device for the rotational body is structured in the following manner.

At first, in order to prevent the resonance of the driving system of the rotational body, matching of the proper oscillation frequency of the driving system with the frequency of the fluctuation component transmitted to the driving system is prevented. Generally, the proper oscillation frequency $\omega$ ($\theta$/sec) is expressed by the following equation.

[EQUATION 1]

$$\omega = \sqrt{\frac{K}{I}}$$

where K indicates the torsional rigidity of the driving system, and I indicates its moment of inertia. In order to prevent the resonance, the value of ω can be changed by changing the value of K or I. In order to prevent the resonance, the value of ω may be larger or smaller with respect to the fluctuation component of the driving system. In order to make the value of ω larger, the value of K is increased or the value of I is decreased. On the other hand, in order to make the value of ω smaller, the value of I is increased or the value of K is decreased.

With respect to the driving system having data shown in FIG. 12, FIG. 13 and FIG. 14 show the power spectrum of the rotational fluctuation and the actually measured value of the transfer function of the driving system in the case where the proper oscillation frequency is changed to a larger value and a smaller value when the structure of the driving system is changed, wherein data is superimposed in the same manner as that of FIG. 12. FIG. 15 shows the comparison of peak values of the transfer function of the foregoing three driving systems. In FIG. 12, when the structure of the driving system is changed in order to decrease the rigidity, the value of K, which is the torsional rigidity of the driving system, is decreased. When the data shown in FIGS. 13, 14 and 15 are compared with each other, the transfer function is decreased together with a change of the number of the proper oscillation in the case where the structure is changed in order to reduce the torsional rigidity K of the driving system so that the proper oscillation frequency is changed to a lower frequency side, wherein the proper oscillation frequency is changed in order to prevent the resonance. It is considered that the foregoing effect can be obtained in the following manner: when the structure is changed in order to change the proper oscillation frequency so that the structure can be flexible, the dumping coefficient is increased; and the rotational fluctuation is absorbed in the driving system itself. From above effects, the following is found: when the structure is changed in order to reduce the torsional rigidity K of the driving system in the case where the proper oscillation frequency is changed in order to prevent the resonance, the value of transfer gain of the fluctuation of the rotational speed is changed; and this is advantageous and effective in that the fluctuation of the speed of the driving system is decreased.

Firstly, according to the aforementioned concept, in the present invention, the proper oscillation frequency of the rotational body driving system is lowered. As a means to lower the rigidity of the rotational body and/or the drive shaft, the following are employed: (1) to reduce the thickness of the cylindrical portion of the rotational body: (2) to form the cylindrical portion from a member of low rigidity: (3) to lower the rigidity of the rotational body by lowering the rigidity with respect to the oscillation in the rotational direction of the flange; (4) to reduce the diameter of the drive shaft for driving the rotational body; (5) to reduce the effective length of the drive shaft; (6) to connect the rotational body with the drive shaft by a member of low rigidity; and (7) to provide a member of low rigidity between the rotational body and the drive unit.

In the present invention, in order to increase the moment of inertia, (1) the motor, drive transmission system, drive system and load of inertia are connected in this order, and a connection member is provided that integrally connects the inertia load with the rotational body, and (2) the thickness of the cylindrical portion of the rotational body is increased.

When rigidity K of the rotational body is reduced, or moment of inertia I is increased, the proper oscillation frequency of the rotational drive system expressed by equation 1 is lowered, so that the proper oscillation frequency can be separated from the frequency of the fluctuation component, and the resonance of the driving system of the rotational body can be prevented. Further, rigidity K of the driving system of the rotational body is practically lowered, therefore the structure can be made flexible, the transfer gain of the driving system of the rotational body is decreased, and thereby a speed fluctuation level of the rotational body can be decreased. As a result of the foregoing, the speed fluctuation of the rotational body is decreased, and the image quality can be greatly improved. Further, the apparatus can be made compact, and the cost can be reduced, and the reliability of the entire system can be improved.

Next, consideration is given to a method in which the natural frequency or the proper oscillation frequency is shifted to the higher frequency side in order to avoid the occurrence of resonance.

In order to shift the natural frequency, torsional rigidity K of the drive system may be increased. As a method for increasing torsional rigidity K, the rigidity of a rotational body may be increased.

Specifically, a reinforcement member is provided in the rotational body for increasing the rigidity.

Due to the foregoing, the natural frequency is shifted to the higher frequency side, so that the natural frequency can be separated from the frequency of a variable component, and the occurrence of resonance of the rotational body drive system can be avoided.

Further, when the rigidity of the rotational body drive system is increased, rotation can be accurately transmitted, and the speed variation of the rotational body can be reduced, so that the quality of an outputted image can be greatly enhanced. Furthermore, it is possible to downsize the apparatus and lower the cost. In this way, the reliability of the entire system can be enhanced.

DETAILED DESCRIPTION OF THE PREFERRED EMBODIMENT

Figure 1:
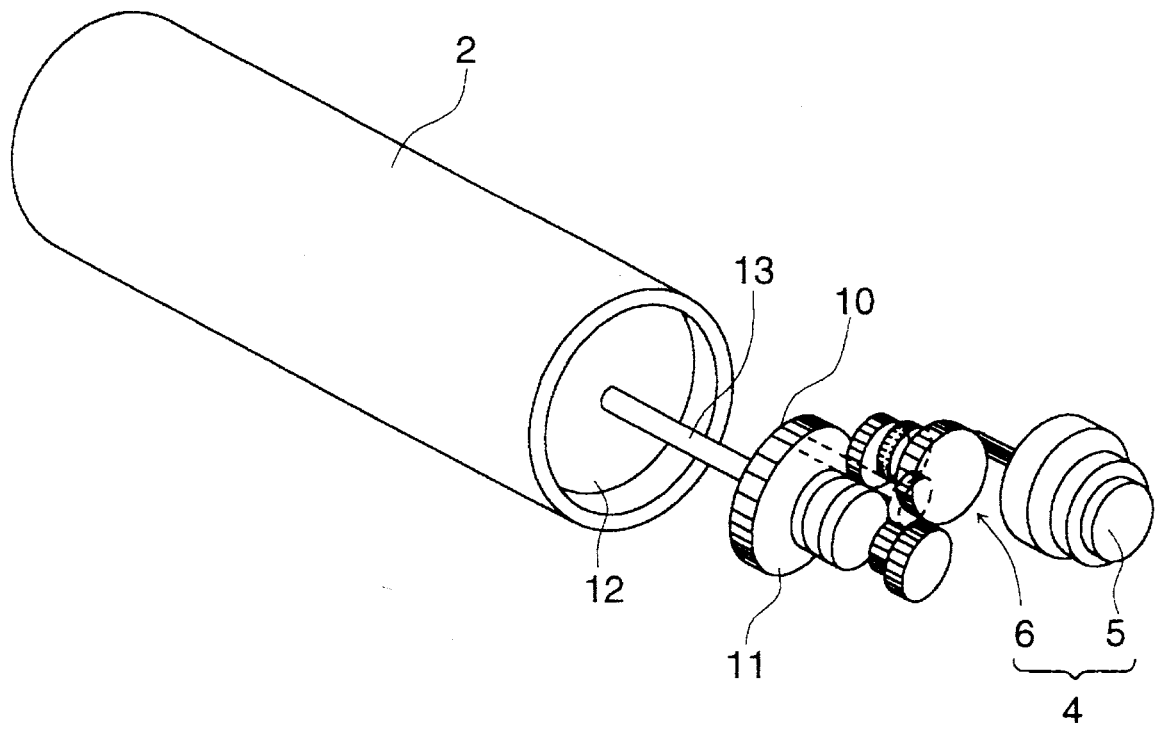
FIG. 1 is a perspective view showing a rotational body drive system relating to the present invention.

Referring to the drawings, the present invention will be described as follows.

Figure 10:
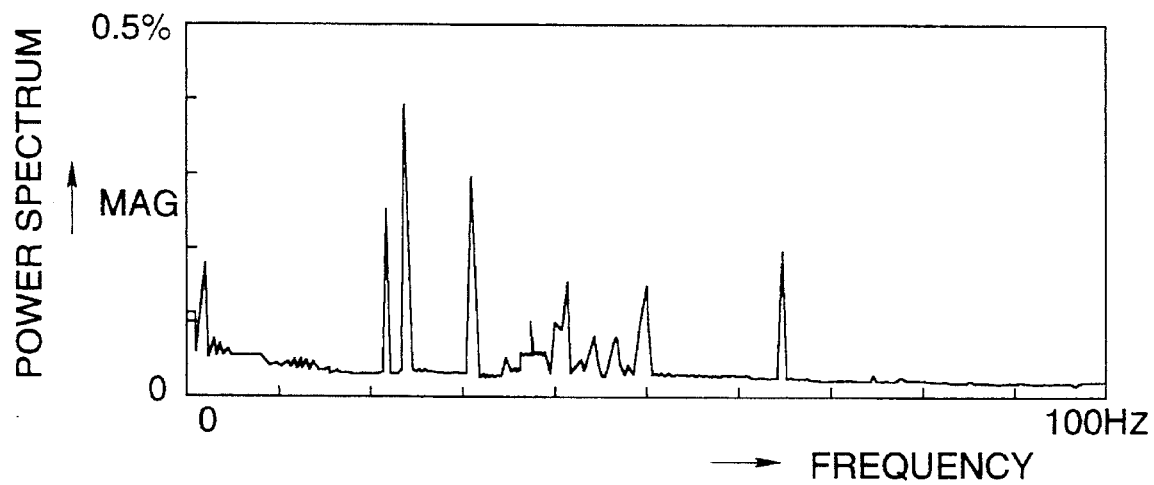
FIG. 10 is a graph showing a power spectrum of speed fluctuation of a conventional photoreceptor.

As shown in FIG. 10, variable components of the speed variation power spectrum of the rotational drive system are described as follows. The variable component by one tooth of the gear is 176 Hz in the case of a gear directly connected with the motor, the variable component is 64 Hz in the case of a gear on the second shaft, and the variable component is 25 Hz in the case of a gear directly connected with the drum. The variable component is 22 Hz in the case where the gear directly connected with the motor is rotated by one revolution.

With respect to the variable component of 25 Hz caused by one tooth of the gear directly connected with the drum, and with respect to the variable component of 22 Hz caused by one revolution of the gear directly connected with the motor, the respective higher harmonic waves are 50 Hz and 44 Hz.

In order to smoothly rotate the photoreceptor drum without causing resonance, the natural frequency of the drive system may be shifted to the lower frequency side with respect to the primary variable components of not more than 150 Hz.

The reason why the variable components are limited to the primary variable components of not more than 150 Hz is that the variable components of not more than 150 Hz most affect the rotation of the photoreceptor-drum.

Figure 11:
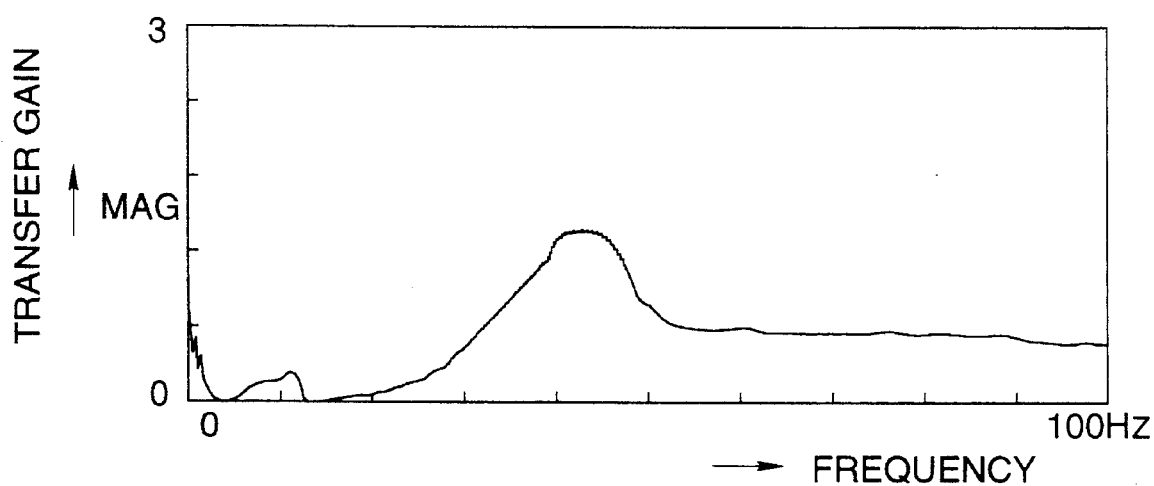
FIG. 11 is a graph showing a transfer function of a conventional photoreceptor drive system.

In the case shown in FIG. 10, the primary components of not more than 150 Hz are 22 Hz, 25 Hz and 64 Hz, and the natural frequency of the drive system shown in FIG. 11 is 43 Hz.

Figure 12:
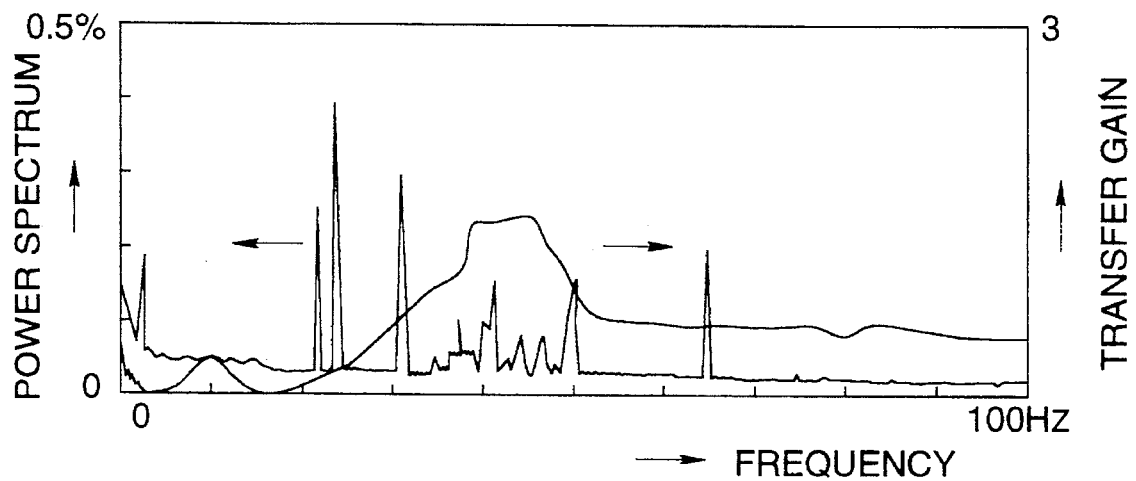
FIG. 12 is a graph in which the power spectrum of speed fluctuation of a conventional photoreceptor and the transfer function of a photoreceptor drive system are integrally shown.

As illustrated in FIG. 12, in the case where the natural frequency of the drive system is not located on the lower frequency side or on the higher frequency side with respect to the primary variable components of not more than 150 Hz, a specific variable component is emphasized due to resonance. Therefore, it becomes impossible to rotate the photoreceptor drum without the fluctuation of speed.

Figure 13:
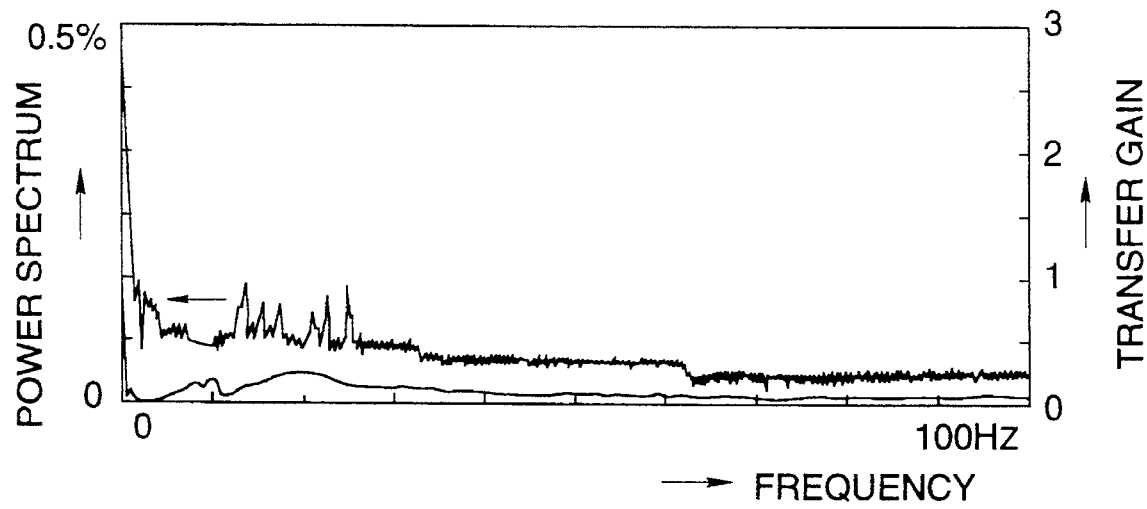
FIG. 13 is a graph in which the transfer function of a photoreceptor drive system and the power spectrum of speed fluctuation of a photoreceptor are integrally shown in the case where the proper oscillation frequency is increased.

On the other hand, as illustrated in FIG. 13, in the case where the natural frequency of the drive system is 20 Hz, the natural frequency is located on the lower frequency side with respect to the primary components of not more than 150 Hz. Therefore, unlike the case shown in FIG. 12, the specific variable components are not emphasized, so that the photoreceptor drum can be smoothly rotated without causing the fluctuation of speed.

Figure 14:
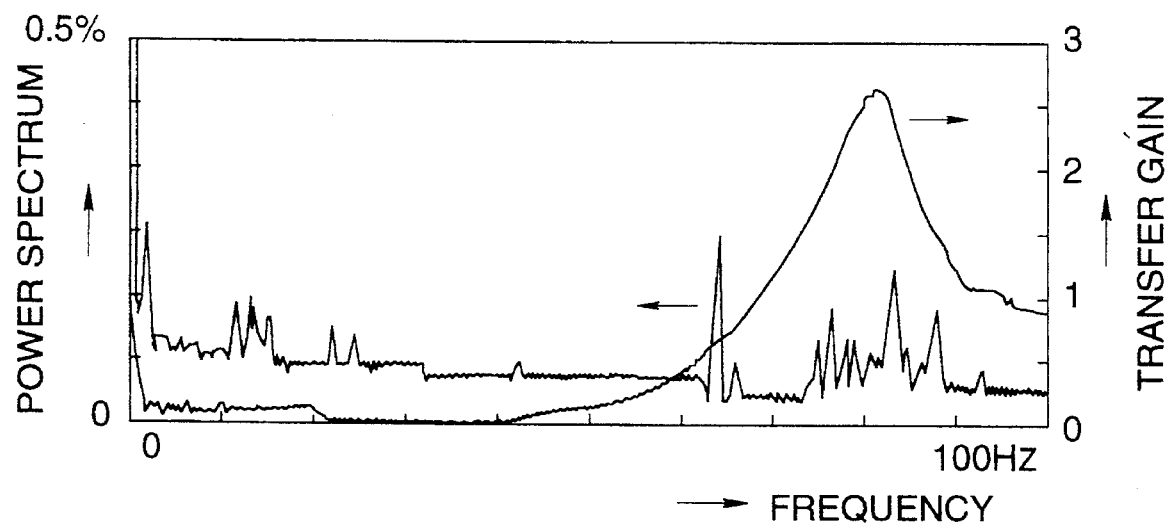
FIG. 14 is a graph in which the transfer function of a photoreceptor drive system and the power spectrum of speed fluctuation of a photoreceptor are integrally shown in the case where the proper oscillation frequency is decreased.
Figure 15:
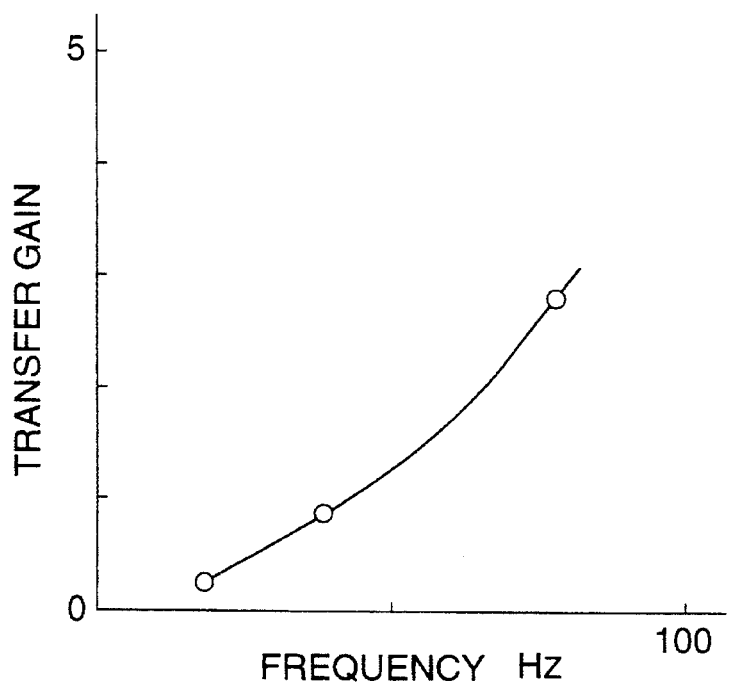
FIG. 15 is a graph showing a peak value of the transfer function of each drive system.

In the case where the natural frequency of the drive system is 80 Hz as illustrated in FIG. 14, the natural frequency of the drive system is located on the higher frequency side with respect to the primary variable components of not more than 150 Hz. Therefore, unlike the case shown in FIG. 12, the specific variable components are not emphasized, so that the photoreceptor drum can be smoothly rotated without causing the fluctuation of speed.

In this connection, the natural frequency of the drive system is a peak value of the transfer function (shown in FIG. 11) measured by the method described above.

First, an embodiment will be explained as follows, in which the natural frequency of the rotational drive system is shifted to the lower frequency side.

Figure 8:
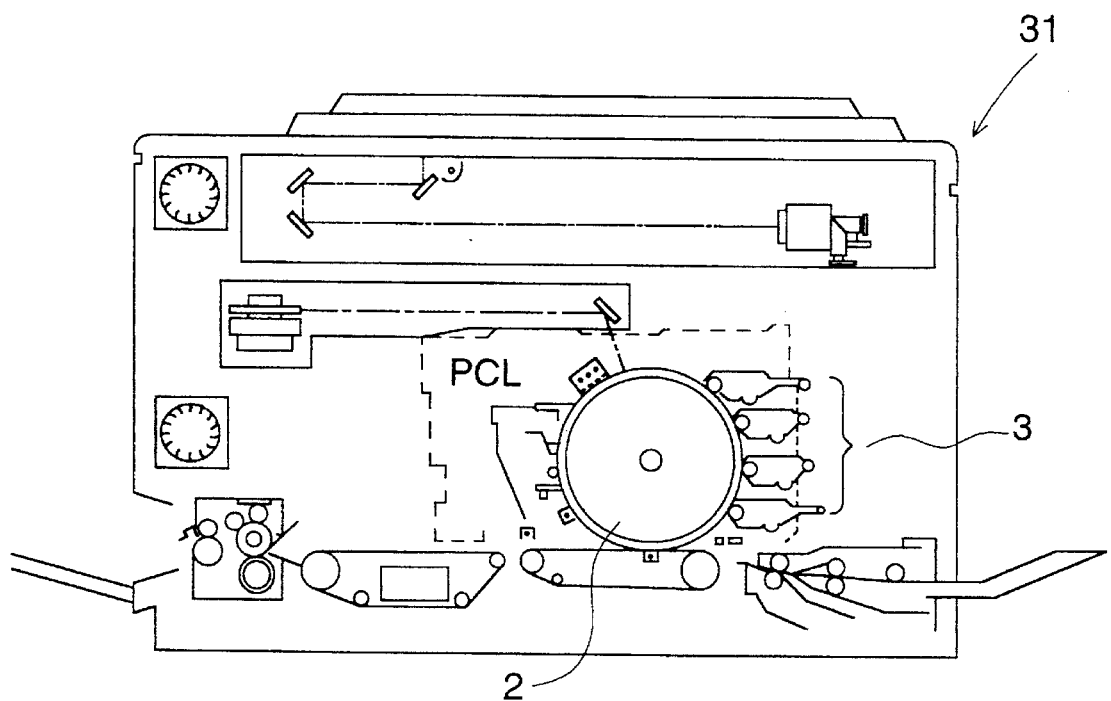
FIG. 8 is a sectional view showing an electrophotographic image outputting device relating to the present invention.

FIG. 8 is a view showing the entire structure of an electrophotographic image output apparatus in which a rotational body of the present invention is used. A photoreceptor drum 2 used for the rotational body, a developing section 3, and a driving mechanism, by which the photoreceptor drum 2 is driven, are provided in an electrophotographic output apparatus 31. The photoreceptor drum 2 and its driving mechanism 4 are shown in FIG. 1. The driving mechanism 4 is composed of a driving motor 5 and a gear group 6 connected therewith. A final gear 10 of the gear group 6 is connected with a driving gear 11 of the photoreceptor drum 2.

The photoreceptor drum 2 is a cylindrical member made of aluminum, and the surface is coated with organic photosensitive material. Thickness of the photoreceptor drum 2 is thin, and a drive shaft 13 is secured to flanges 12 provided on both sides of the photoreceptor drum 2. The drive shaft 13 is rotatably supported by bearings (not shown), and a drive gear 11 is mounted on the end of the drive shaft 13.

As described above, the photoreceptor drum 2 is made of a thin cylindrical member, the rigidity of the rotational direction is lowered, so that the proper oscillation frequency can be reduced. Therefore, due to a relation with the frequency of a fluctuation component generated in the drive mechanism 4, the proper oscillation frequency and the fluctuation component can be separated from each other, so that the resonance of the photoreceptor drum 2 can be prevented, and the photoreceptor drum 2 can be smoothly rotated without causing fluctuations of speed. Accordingly, image quality can be remarkably improved.

The photoreceptor drum 2 is structured in such a manner that the rigidity is lowered. As a result, the transfer gain of the photoreceptor drum 2 can be lowered, so that the speed fluctuation of the final gear 10 can be easily damped, and the speed fluctuation of the photoreceptor drum 2 can be inhibited.

Instead of reducing the thickness of the photoreceptor drum 2, a metal of low rigidity such as an aluminum alloy may be used for the photoreceptor drum 2 so as to provide the same effect.

Figure 2:
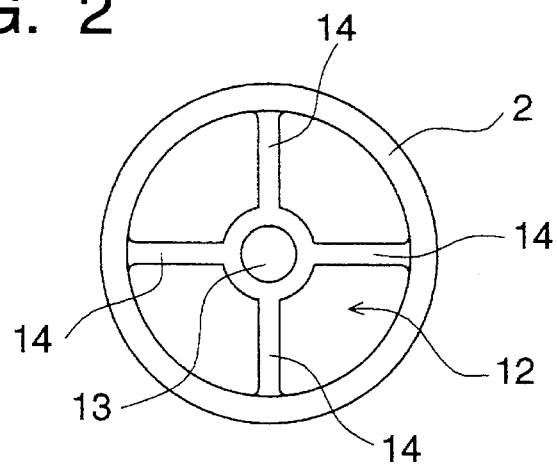
FIG. 2 is a side view showing another example of a photoreceptor drum.

FIG. 2 shows another example. In the photoreceptor drum shown in FIG. 2, the thickness of the flange 12 or the rib 14 is reduced so that the rigidity of the rotational direction is lowered. According to the aforementioned method, the rigidity of the photoreceptor drum 2 can be lowered, so that the proper oscillation frequency is reduced and the resonance caused by the fluctuation component can be prevented. Accordingly, the rotational speed of the photoreceptor drum 2 can be maintained constant.

Figure 3:
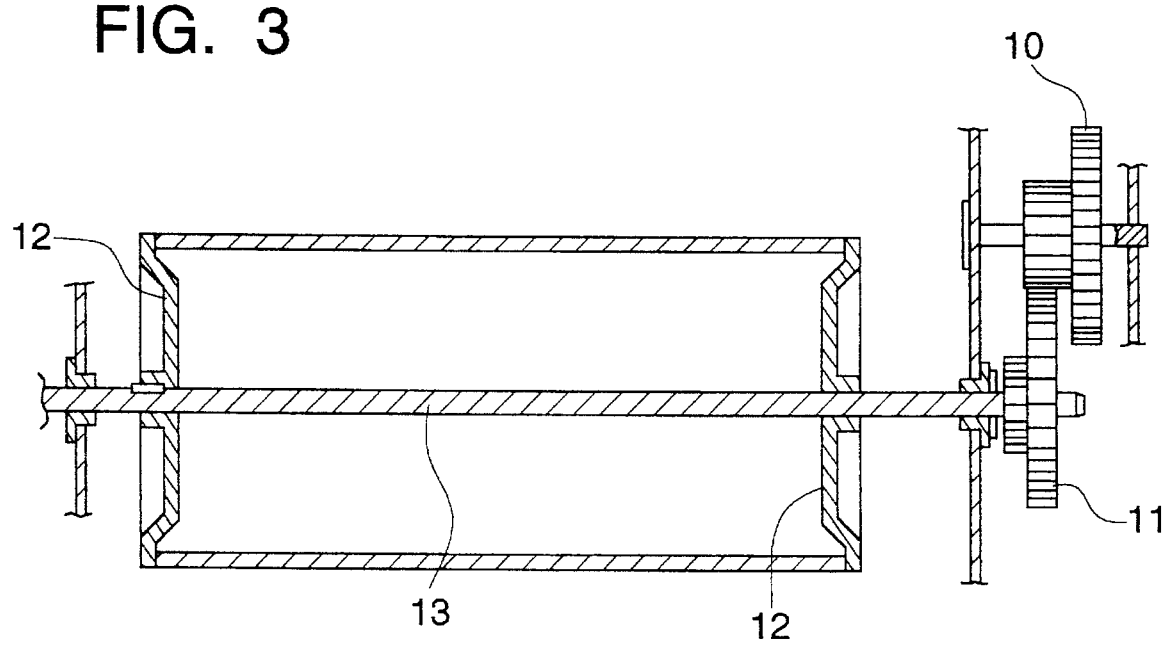
FIG. 3 is a sectional view showing another example of a photoreceptor drum.

FIG. 3 shows a photoreceptor drum 2 in which the rigidity of the drive shaft 13 is lowered. In this case, the diameter of the drive shaft 13 is reduced, so that the rigidity of the drive shaft 13 can be lowered and the proper oscillation frequency of the rotational body drive system can be lowered. As a result, the proper oscillation frequency does not coincide with the fluctuation component of the drive mechanism 4. In this way, the fluctuation of rotational speed of the photoreceptor drum 2 can be reduced. In this case, instead of reducing the diameter of the entire drive shaft 13, the diameter of a portion of the drive shaft 13 may be reduced, and alternatively the drive shaft 13 may be made of a member of low rigidity.

Figure 4:
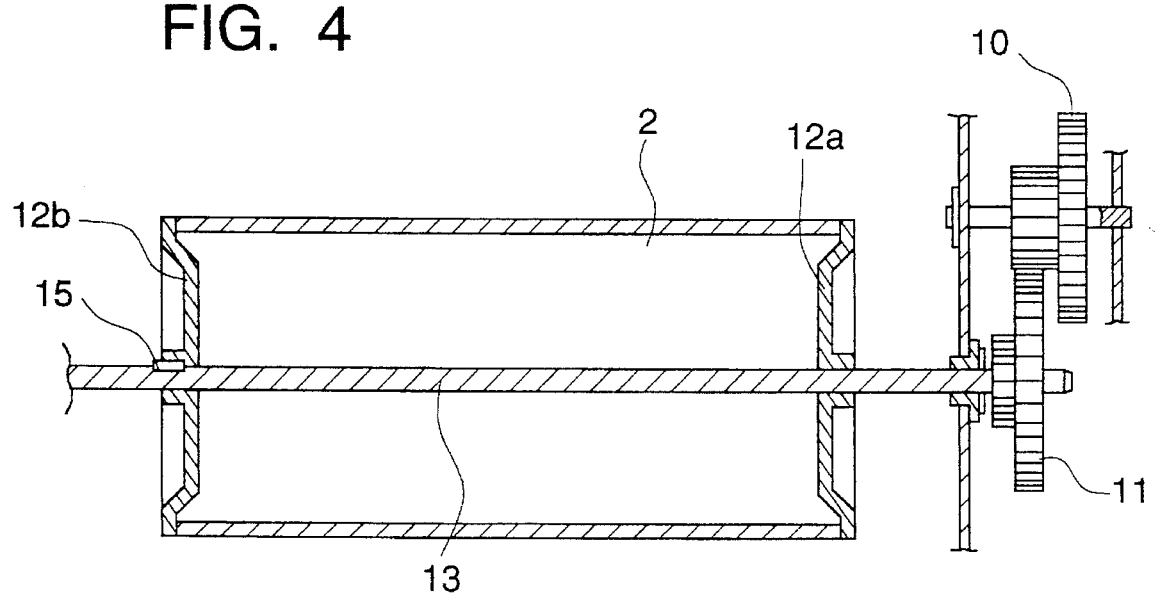
FIG. 4 is a sectional view showing another example of a photoreceptor drum.

FIG. 4 shows another example. In this example, the flange 12a on the drive gear 11 side is not secured to the drive shaft 13 so that the flange 12a can be freely rotated around the drive shaft 13, and the other flange 12b opposed to this flange 12a is connected with the drive shaft 13 by a pin 15. As a result of the foregoing, the effective length (the length from the drive gear 11 to the photoreceptor drum 2) of the drive shaft 13 can be substantially extended, so that the rigidity can be lowered and the proper oscillation frequency is lowered to prevent the resonance. Consequently, the fluctuation of rotational speed can be prevented, and further the transfer gain can be lowered, and the transmission of oscillation can be reduced. Therefore, the rotational speed of the photoreceptor drum 2 can be maintained constant.

Figure 5:
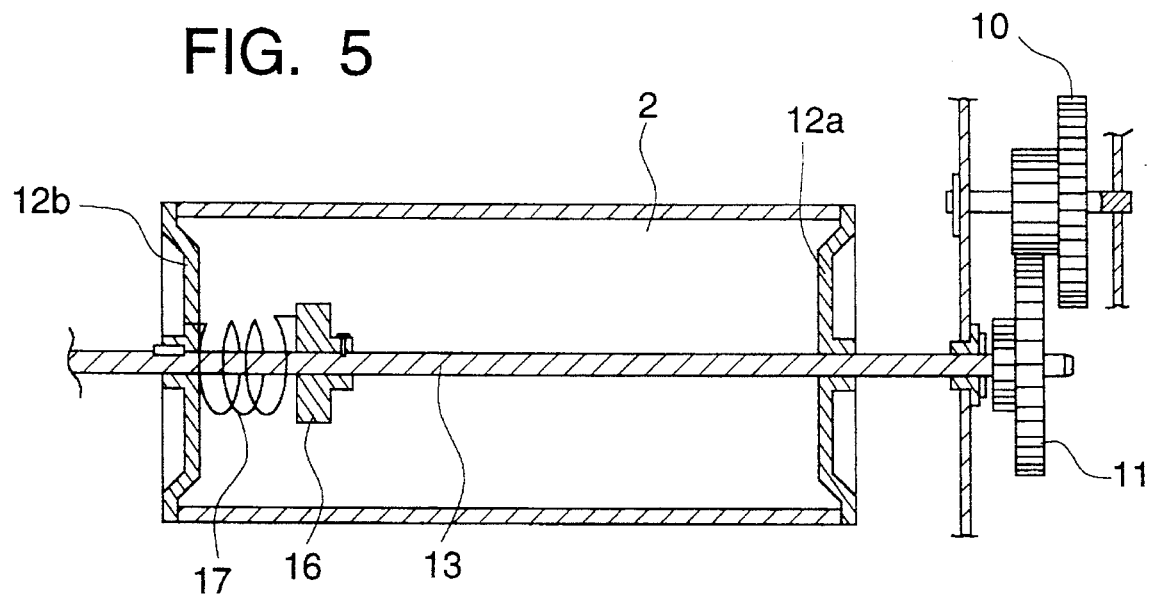
FIG. 5 is a sectional view showing another example of a photoreceptor drum.

FIG. 5 shows an example in which the drive shaft 13 and the photoreceptor drum 2 are connected with each other by a low rigidity member. In this case, both flanges 12a and 12b are rotatably provided to the drive shaft 13, and a spring member 17 is provided between a fixed member 16 secured to the drive shaft 13 and the flange 12b. According to the aforementioned structure, can be obtained the same effect as that of a case in which the rigidity of the drive system composed of the photoreceptor drum 2 and the drive shaft 13 is reduced. Therefore, the proper oscillation frequency is lowered, so that the resonance caused by the oscillation of the drive system 4 can be prevented. Further, the fluctuation of the rotational speed inputted into the drive shaft 13 can be absorbed by the low rigidity member. As a result, the photoreceptor drum 2 can be smoothly rotated while the fluctuation of the rotational speed of the photoreceptor drum 2 is avoided.

In this example, instead of the spring member 17, a resilient member such as a rubber member may be provided between the fixed member 16 and the flange 12b. This low rigidity member may be provided outside the flange 12 instead of providing inside the flange 12, so that the low rigidity member is connected with the flange 12a or 12b.

Figure 6:
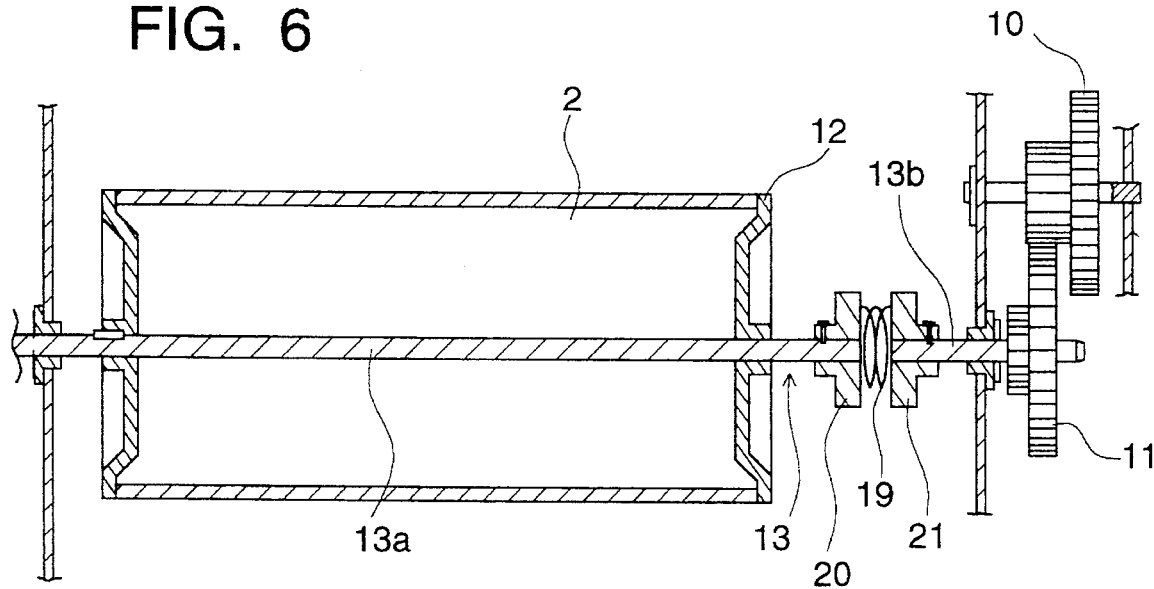
FIG. 6 is a sectional view showing another example of a photoreceptor drum.

FIG. 6 shows an example of the photoreceptor drum in which a resilient member is provided in the middle of the drive shaft 13. In this example, the drive shaft 13 is divided into drive shafts 13a and 13b, and the drive shaft 13a is secured to the rotational body 2, and the drive shaft 13b is secured to the drive gear 11. A spring member 19 is provided between the flange 20 secured to the drive shaft 13a and the flange 21 secured to the drive shaft 13b, so that the flanges 20 and 21 are connected with each other through the spring member 19. In the aforementioned manner, the proper oscillation frequency of the rotational body drive system can be lowered so that the occurrence of resonance can be prevented, and the fluctuation of the rotational speed can be reduced and the photoreceptor drum 2 can be rotated at a constant speed.

In the aforementioned example, instead of the spring member 19, a visco elastic member such as a rubber member may be provided to obtain the same effect.

Figure 7:
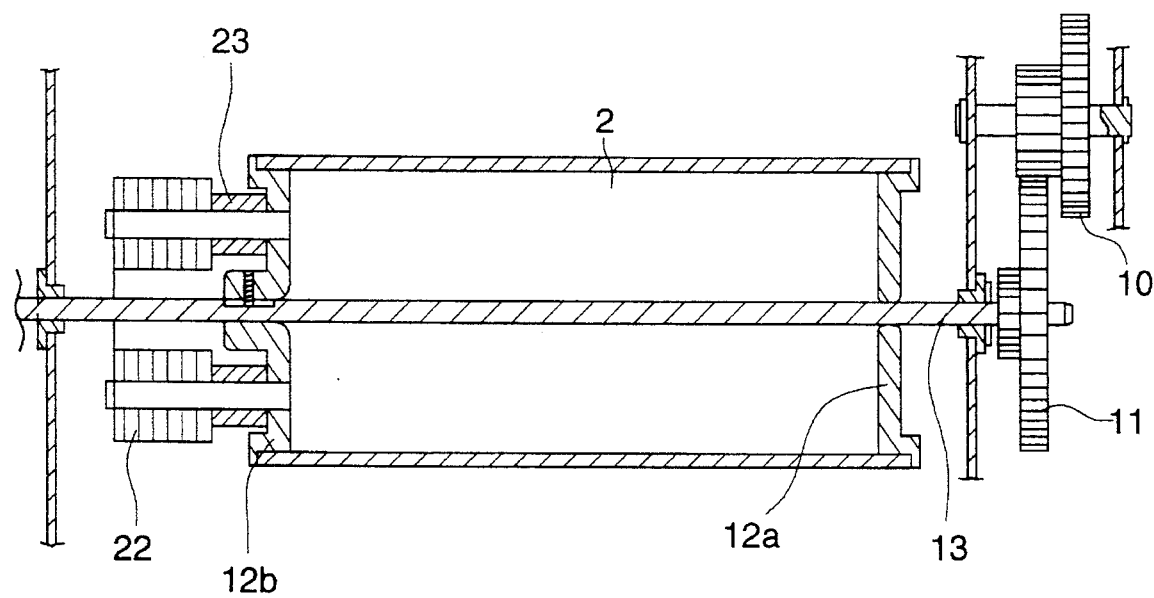
FIG. 7 is a sectional view showing another example of a photoreceptor drum.

FIG. 7 shows an example of the photoreceptor drum in which the moment of inertia of the drive system is increased. The flanges 12a and 12b are provided on sides of the photoreceptor drum 2, and the flange 12a is rotatably provided to the drive shaft 13. The drive gear 11 is secured to the drive shaft 13, and the drive shaft 13 is connected with the flange 12b provided on the far side with respect to the drive source. An inertia load 22 such as a stack of steel plates is secured to the flange 12b through a connecting member 23. A ratio of moment of inertia I1 of the photoreceptor drum 2 to moment of inertial I2 of the inertia load 22 is preferably in a range from 0.05 to 0.4. According to the aforementioned structure, the proper oscillation frequency of the drive system can be reduced, so that the resonance of the drive system can be prevented. Accordingly, the quality of outputted images can be remarkably improved. The inertia load 22 may be provided inside the photoreceptor drum 2 instead of providing outside the flange 12.

In order to increase the moment of inertia of the drive system, the thickness of the photoreceptor drum 2 may be increased. When the thickness of the photoreceptor drum 2 is increased, the moment of inertial of the photoreceptor drum 2 is increased, so that the inertial of the entire drive system can be increased, so that the proper oscillation frequency of the drive system can be lowered and the occurrence of resonance can be prevented. As a result, the image quality can be remarkably improved.

In the aforementioned examples, the rotational body is composed of the photoreceptor drum 2, however, the rotational body may not be the photoreceptor drum, and as shown in Pig. 9, a belt-shaped photoreceptor 25 may be provided, and a drive roller 26 to drive this photoreceptor 25 may be used as the rotational body of the present invention. Even in this case, the aforementioned examples can be applied to the drive roller 26, and the drive roller 26 can be rotated without the fluctuation of rotational speed. Consequently, the photoreceptor 25 can be rotated at a constant speed. As a result, the quality of an outputted image can be greatly improved.

As described above, the rigidity of the rotational body drive system is reduced and the moment of inertia is increased so that the proper oscillation frequency is lowered. As a result of the foregoing, the proper oscillation frequency does not coincide with the frequency of speed fluctuation transmitted to the drive system. Accordingly, the resonance of the photoreceptor drum 2 or the drive roller 26 can be prevented. Further, when the rigidity is lowered, the transfer gain of the photoreceptor drum 2 or the drive roller 26 is lowered, so that the speed fluctuation is difficult to be transmitted. Accordingly, the occurrence of speed fluctuation of the photoreceptor drum 2 or the photoreceptor belt 25 is not caused, and the photoreceptor drum 2 or the photoreceptor belt 25 can be rotated at a constant speed, so that the image quality can be greatly improved. Furthermore, the apparatus can be made compact and the cost can be reduced, and the reliability of the entire system can be remarkably improved.

According to the rotational body drive device of the present invention, when the rigidity of the rotational body and that of the rotational body drive system composed of the drive shaft are lowered and the moment of inertia is increased, the proper oscillation frequency is lowered, so that the proper oscillation frequency does not coincide with the frequency of the fluctuation component generated when the drive motor and the drive gears are rotated. As a result of the foregoing, the occurrence of resonance of the rotational body can be prevented, so that the rotational body can be smoothly rotated without any speed fluctuations. When the structure is changed to lower the rigidity, the transfer gain of the transmission system can be lowered, so that the transmission of fluctuation can be inhibited and the speed fluctuation of the rotational body can be further reduced. As a result of the foregoing, the irregularity of an image caused in the auxiliary scanning direction of the writing system can be reduced, so that the image quality is greatly improved. Further, the conventional large-sized complicated apparatus can be made compact according to the present invention. Furthermore, the cost can be reduced, and the mechanism can be simplified. As a result, the reliability of the entire system can be remarkably improved.

The inventors have made a study and devised various specific examples except for the aforementioned ones. The devised examples will be explained as follows.

In order to lower the proper oscillation frequency of the aforementioned rotational body drive system, the following means is employed: the drive shaft can be freely rotated in a flange disposed on the drive gear side; and the drive shaft is secured to a flange disposed on the side opposite to the drive gear.

Figure 16:
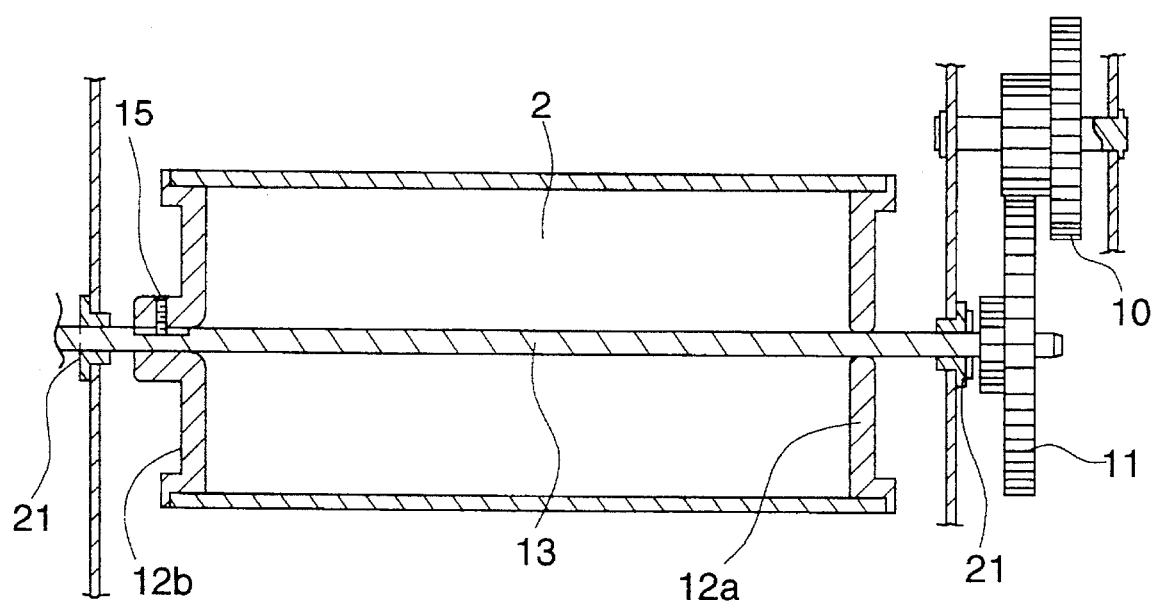
FIG. 16 is a sectional view showing an example in which the effective length of the drive shaft of the photoreceptor drum of the present invention is extended and the rigidity is reduced.

In this example, flanges 12a and 12b are provided on both ends of the photoreceptor drum as shown in FIG. 16, and the side surface of the photoreceptor drum is coated with organic photosensitive material. The drive shaft 13 penetrates through the center of the flange 12a. This drive shaft 13 is rotatably supported by bearings 21, and the drive gear 11 is mounted on the end of the shaft. This drive gear 11 is engaged with the final gear 10. The flange 12a, which is disposed on the drive gear 11 side, is not fixed to the drive shaft 13, so that the flange 12a can be rotated around the drive shaft 13. On the other hand, the other flange 12b is integrally secured to the drive shaft 13 by a pin 15.

As described above, the flange 12a on the drive gear 11 side can be freely rotated around the drive shaft 13, and the flange 12b disposed on the side opposite to the flange 12a is connected with the drive shaft 13. As a result of the foregoing, the effective length of the drive shaft of the rotational body drive system including the photoreceptor drum 2, drive shaft 13 and drive gear 11 is extended, so that the rigidity of the drive system after the drive gear is lowered. Therefore, the proper oscillation frequency of the rotational body drive system is lowered. Accordingly, this proper oscillation frequency can be set at an appropriate value, and the fluctuation component and proper oscillation frequency can be separated from each other by a relation of the frequency of the fluctuation component generated in the drive mechanism 4.

Figure 17:
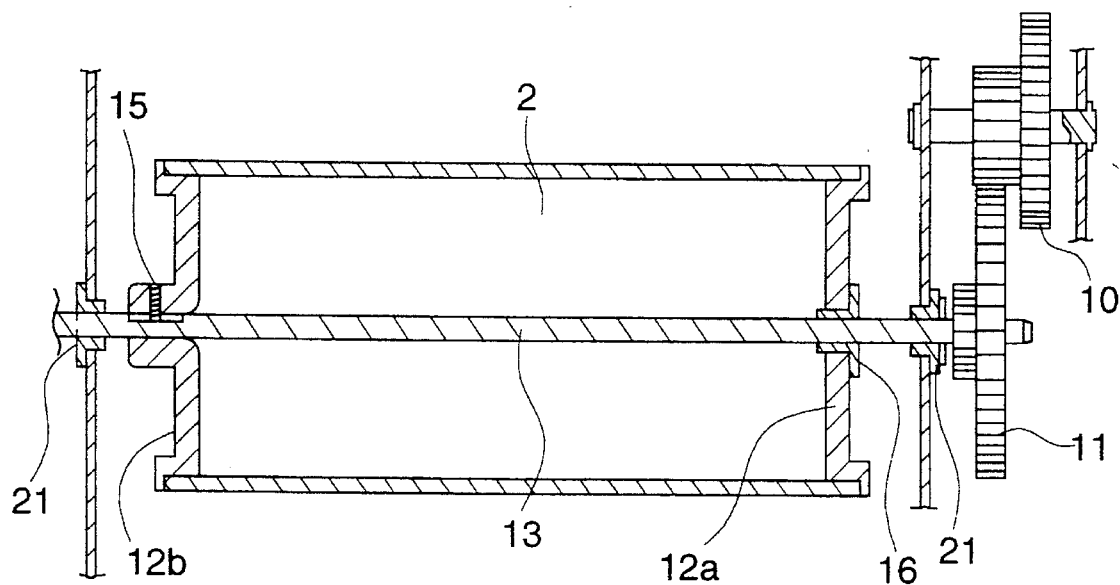
FIGS. 17 and 18 are sectional views showing another example of the composition shown in FIG. 16.

FIG. 17 shows another example. In this example, a plain bearing 16 is provided in the center of the flange 12a. This plain bearing 16 is of a sintered metal type in which lubricant is contained. This bearing is engaged with the flange 12a and slides around the drive shaft 13. From the foregoing, the dimensional accuracy can be ensured between the drive shaft 13 and the flange 12a, and further the drive shaft 13 can be more smoothly rotated in the flange 12a, so that the image quality can be improved.

Figure 18:
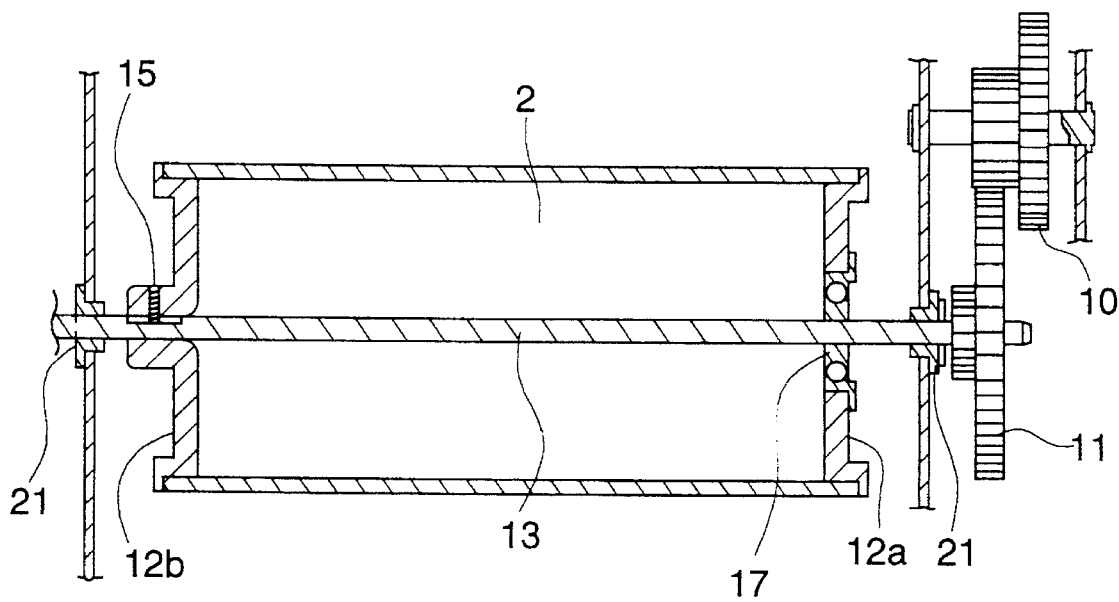

Further, a ball bearing 17 may be provided to the flange 12a as shown in FIG. 18. In the same manner as the aforementioned case in which the plain bearing 16 is used, the rigidity of the photoreceptor drum 2 is reduced and the proper oscillation frequency can be also lowered in this case. As a result, the proper oscillation frequency and the fluctuation component in the frequency region are separated from each other, so that the occurrence of resonance can be prevented, and at the same time the drive shaft 13 can be smoothly supported when it is rotated. Further, the dimensional accuracy can be ensured, and the speed fluctuation of the photoreceptor drum 2 is reduced. As a result, the image quality can be greatly improved.

According to the rotational body drive device of the present invention, in the drive system including the drive shaft driven by the drive motor and the rotational body rotated at a constant speed by the drive shaft, the flange disposed on the drive gear side is freely rotated with respect to the drive shaft, and the flange disposed on the side opposite to the drive gear is integrally connected with the drive shaft, so that the rigidity of this rotational body drive system is lowered and the proper oscillation frequency is lowered. Therefore, the proper oscillation frequency does not coincide with the frequency of the fluctuation component generated by the rotation of the drive motor and gears connected to the motor. Accordingly, the resonance of the rotational body can be prevented, and the rotational body can be smoothly rotated without causing the fluctuation of speed.

Figure 19:
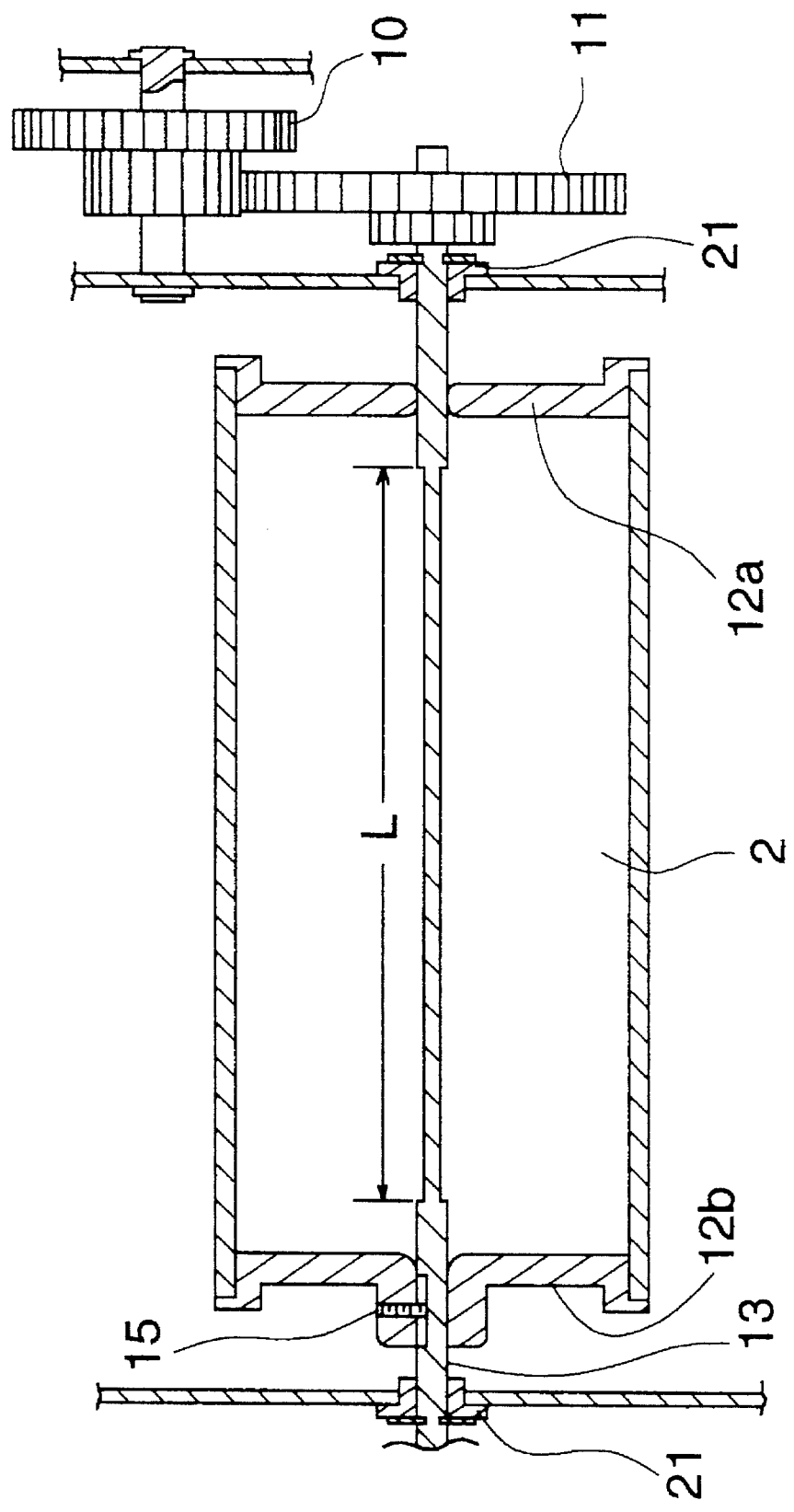
FIGS. 19 and 20 are sectional views showing an example of the photoreceptor drive system according to the present invention.

In the example shown in FIG. 19, the diameter of a portion of the drive shaft is made small, and the drive shaft can be freely rotated in the flange on the drive gear side, and the flange disposed opposite to the drive gear side is connected with the drive shaft.

In this example, the flange of the rotational body is connected with the drive shaft on the far side with respect to the drive gear, so that the effective length of the drive shaft is increased, and further the diameter of a portion of the drive shaft is made small. Therefore, rigidity K of the drive system can be further decreased. As a result, the proper oscillation frequency of the rotational body drive system expressed by equation 1 is lowered.

Figure 9:
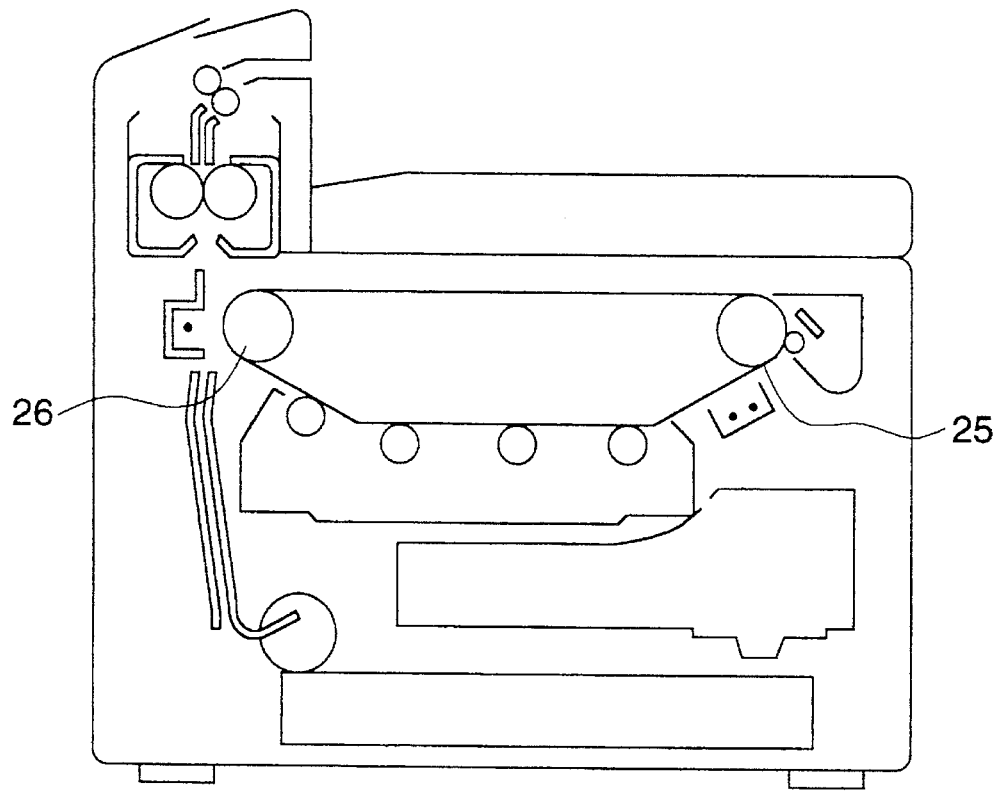
FIG. 9 is a sectional view showing an electrophotographic image outputting device relating to the present invention.
Figure 20:
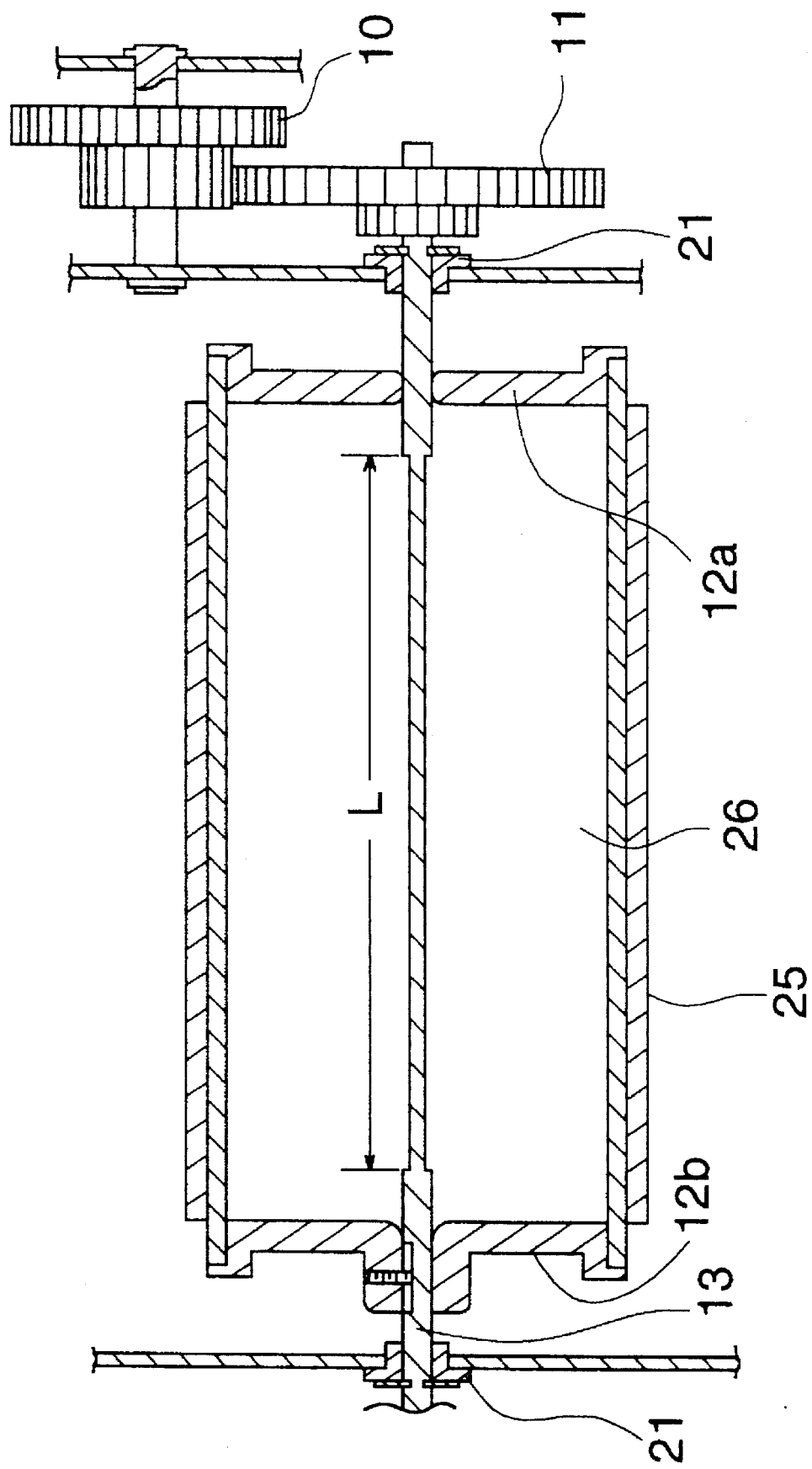

In the example shown in FIG. 20, the belt-shaped photoreceptor 25 is provided in the same manner as the apparatus shown in FIG. 9, and the drive shaft of a small diameter of the invention is applied to the drive roller 26 to drive this belt-shaped photoreceptor 25. Also, in this case, the drive roller 26 can be smoothly rotated without fluctuations of speed, so that the belt-shaped photoreceptor 25 can be rotated at a constant speed. Accordingly, the quality of outputted images can be greatly improved.

As the inertia load is provided on the far side with respect to the drive system, the moment of inertia I is increased, and the effective length of the drive shaft is increased. Accordingly, rigidity K of the drive system after the drive gear is substantially lowered, and the proper oscillation frequency is decreased. This example will be described as follows.

Figure 21:
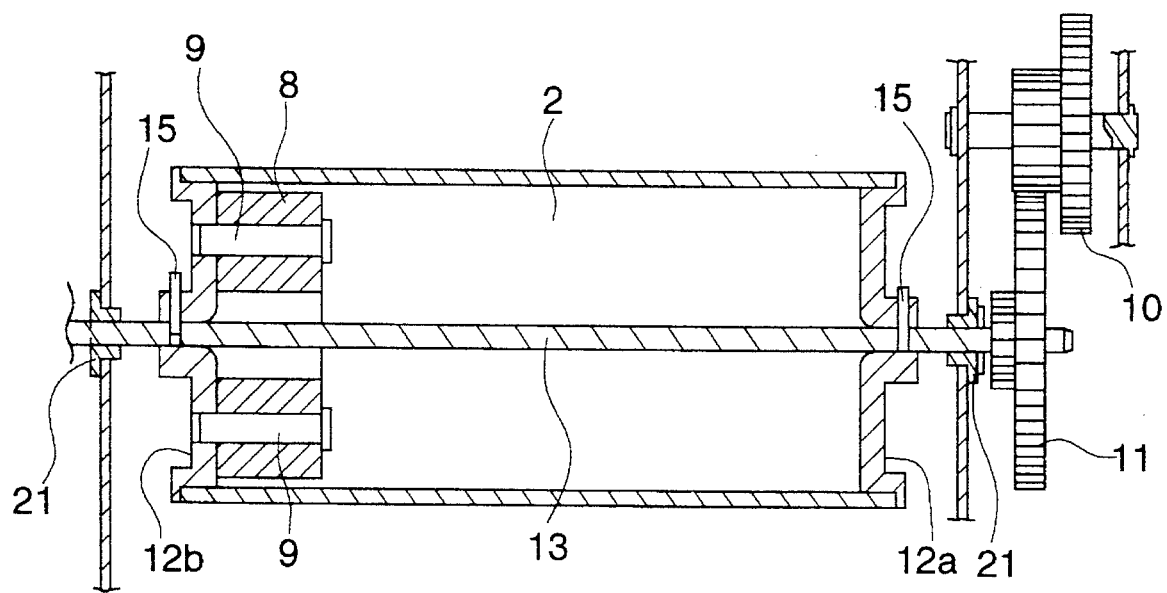
FIGS. 21, 22 and 23 are sectional views of an example in which an inertia member is attached to the photoreceptor.

The inertia member 8 shown in FIG. 21 is a ring-shaped weight made of steel, stainless steel, brass and the like. The larger the specific gravity of the material is, the more compact the dimensions become. It is preferable that a ratio of the moment of inertia I1 of the photoreceptor drum 2 to the moment of inertial I2 of this inertia member is in a range of 0.05 to 0.4.

Since the inertia member 8 is mounted on the flange 12$b$ disposed on the far side of the drive gear 11, the moment of inertia I of the drive system composed of the photoreceptor drum 2, drive shaft 13 and drive gear 11 is increased. In addition to that, the distance from the drive gear 11 to the inertia member 8 is increased, so that the rigidity K of the drive system is substantially lowered. Therefore, the proper oscillation frequency of the drive system is reduced.

Figure 22:
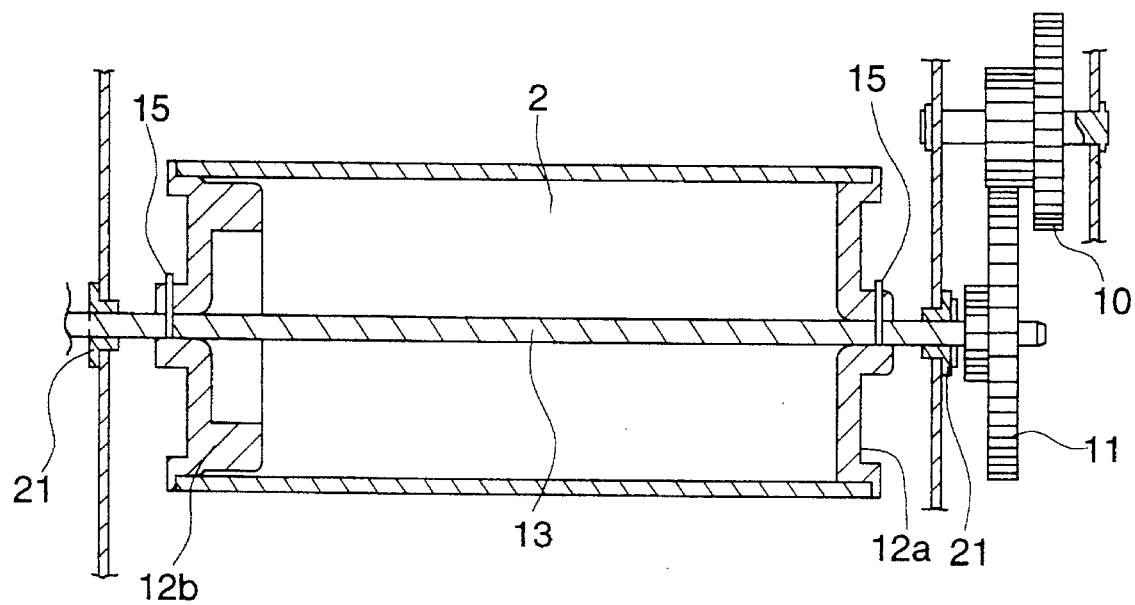

FIG. 22 shows another example of the inertia member 8. In this example, the flange 12$b$ is composed of a member having a large moment of inertia. In the case where the moment of inertia I of the drive system is increased, the inertia load of the flange itself may be increased as described above. In this manner, the fluctuations of speed are reduced, so that the image quality can be improved, and the assembly process can be simplified. Further, the number of parts can be reduced. As a result of the foregoing, the cost can be reduced.

Figure 23:
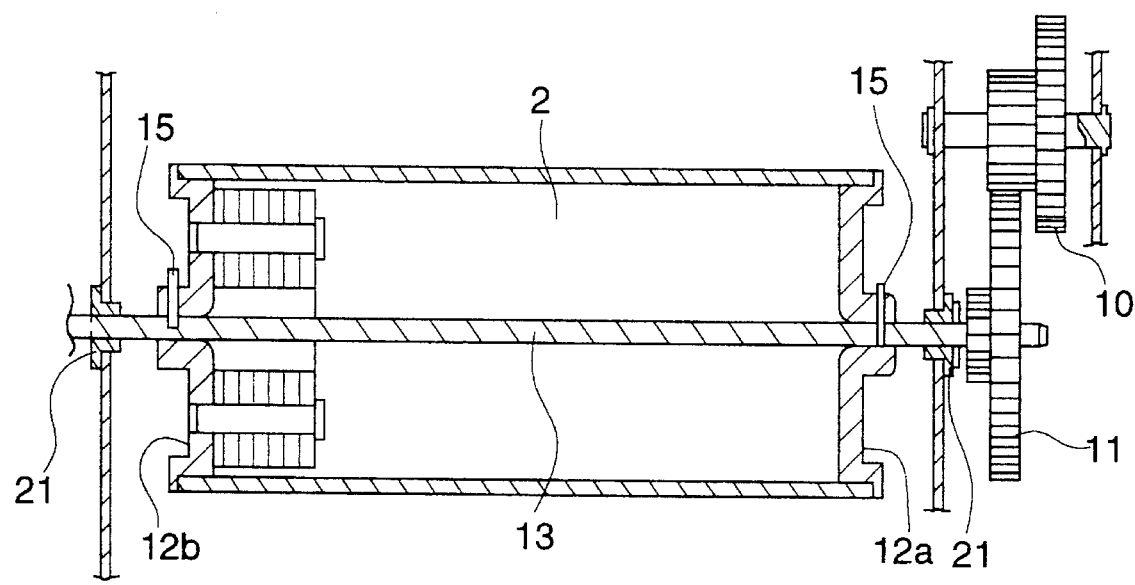

FIG. 23 shows another example of the inertia member 8. In this example, the inertia member 8 is formed from stacked metallic sheets. When the number of the metallic sheets is changed, the moment of inertia I can be easily adjusted.

Next, an example will be explained in which a circular inertia member is movably provided in the rotational body, and when this inertial member is appropriately disposed in the rotational body, the distribution of moment of inertia can be arbitrarily set.

Figure 24:
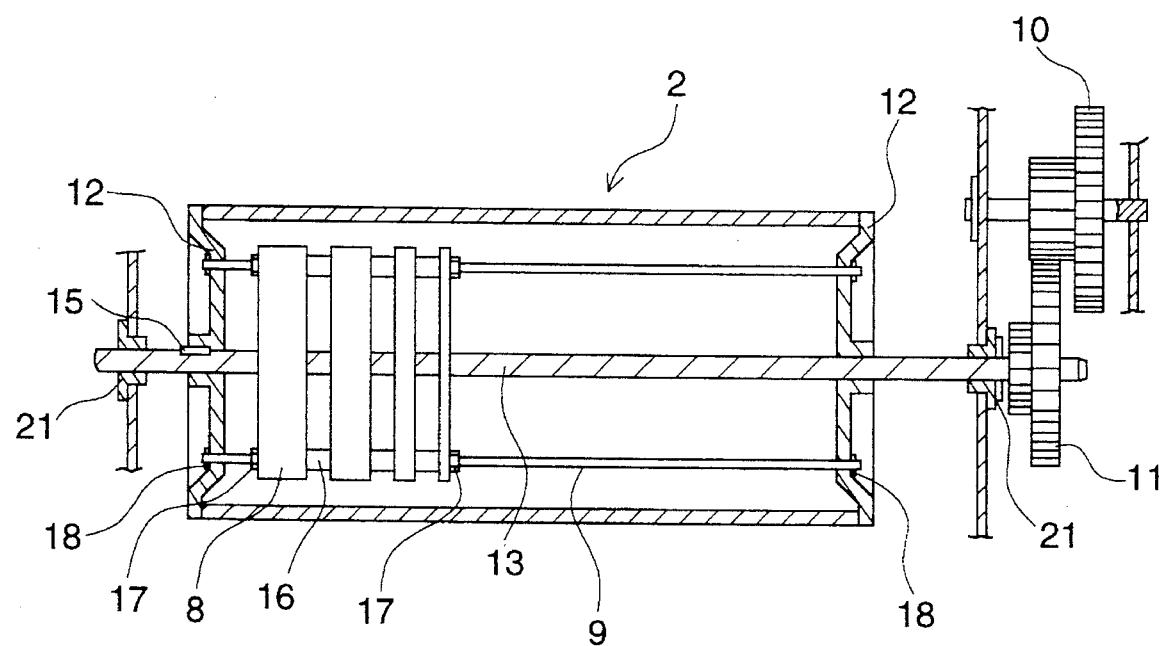
FIG. 24 is a sectional view showing an example of a photoreceptor drum to which a movable inertia member is provided.

As shown in FIG. 24, in this example, a plurality of inertia members 8 are provided inside the photoreceptor drum 2 in parallel with the flange 12.

Figure 25:
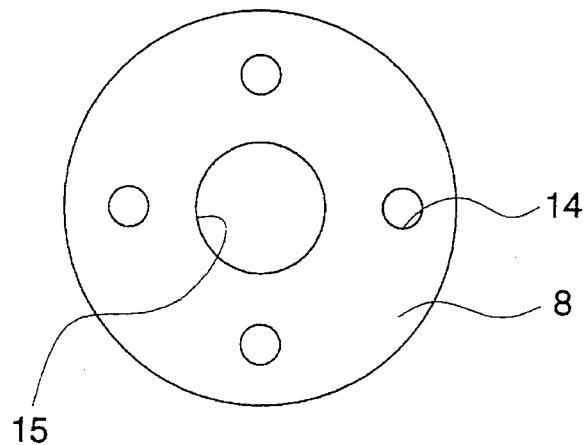
FIG. 25 is a front view showing an example of the inertia member.

The inertia member 8 is shown in FIG. 25. The inertia member 8 is composed of a relatively heavy member made of a metal. A hole 15 to pass the drive shaft 13 is formed in the center of the inertia member 8, and four holes 14 are formed around the hole 15 at regular intervals. The inertia members 8 of various thickness are prepared and secured in the photoreceptor drum 2 in the following manner: a spacer 16 is provided between the inertia members 8; a connecting rod 9 is inserted into the hole 14; and the inertia members 8 are fixed at regular intervals, wherein the inertia members 8 are concentrated on the far side of the drive gear 11. Each inertia member 8 is secured with a screw 17, and the connecting rod 14 is secured to the flanges 12 disposed on both sides with screws 18.

As described above, the inertia members 8 are provided inside the photoreceptor drum 2 so that the inertia members 8 are located on the far side with respect to the drive gear 11. Therefore, the moment of inertia of the photoreceptor drum 2 is increased. As a result, the proper oscillation frequency is lowered. Accordingly, when this proper oscillation frequency is set at an appropriate value, and the proper oscillation frequency and the fluctuation component are separated from each other in the relation of the frequency of the fluctuation component generated in the drive mechanism 4, the resonance of the photoreceptor drum 2 can be prevented. Therefore, the photoreceptor drum 2 can be smoothly rotated without any speed fluctuations, so that the quality of outputted images can be remarkably improved.

On the contrary, when the inertia members 8 are disposed being concentrated on the drive gear 11 side, the effective length with respect to the rigidity of the drive shaft 13 is reduced and rigidity K is increased and further the inertia is increased. In this way, the proper oscillation frequency can be increased. As a result of the foregoing, the proper oscillation frequency and the fluctuation component can be separated from each other, so that the resonance can be prevented. Accordingly, the speed fluctuation of the photoreceptor drum 2 can be decreased, and the image quality can be remarkably improved.

Figure 26:
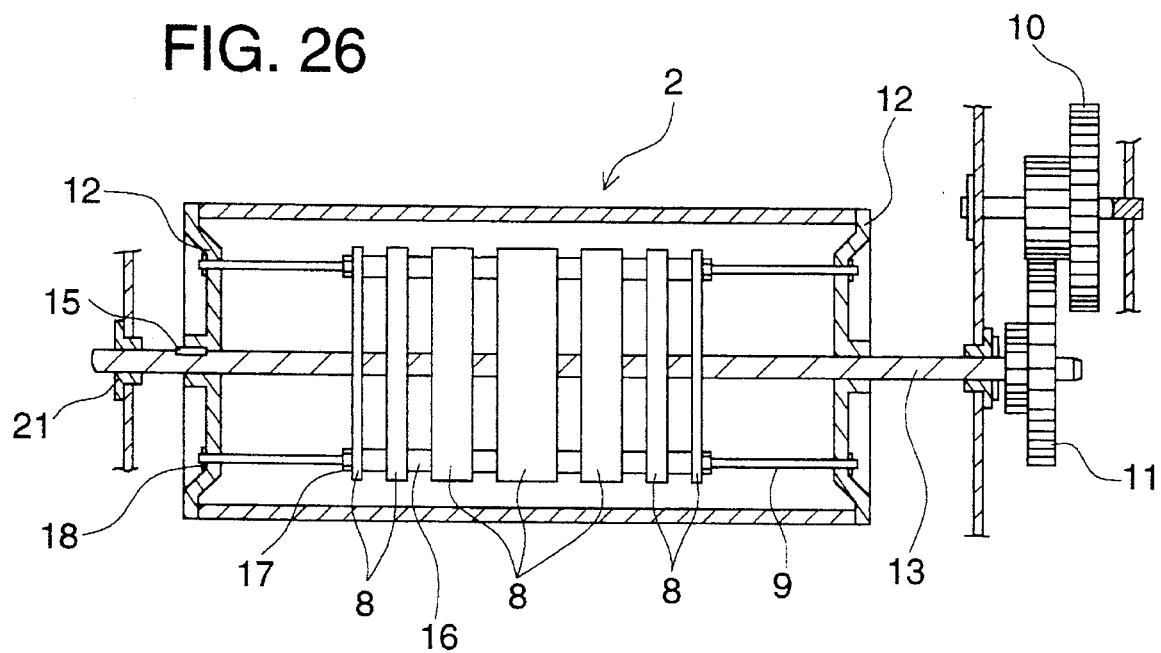
FIG. 26 is a sectional view showing an example of a photoreceptor drum to which a movable inertia member is provided.

Further, when the length of the spacer 16 and the position of the screw 17 are changed, the mount position and interval of the inertia member 8 are changed. In this way, the moment of inertia can be changed, so that a more appropriate distribution of moment of inertia can be provided. For example, in the case where the inertia distribution of the photoreceptor drum 2 is not uniform, the inertia members 8 inside the photoreceptor drum 2 are appropriately disposed as shown in FIG. 26, so that the distribution can be made uniform.

In the case where a delicate balance is required for the proper oscillation frequency, it can be easily adjusted when the inertia members 8 are added or removed.

As described above, when the inertia members 8 are movably provided inside the photoreceptor drum 2, the moment of inertia of the drive system can be increased and the rigidity can be also increased, so that the proper oscillation frequency can be decreased or increased. In this way, the proper oscillation frequency is made not to coincide with the frequency of speed fluctuation transmitted to the drive system. Accordingly, the occurrence of resonance of the photoreceptor drum 2 or the drive roller 26 can be prevented. Further, when the distribution of moment of inertia is delicately changed so as to provide an appropriate distribution of moment of inertia, speed fluctuations are not caused in the photoreceptor drum 25, and it can be rotated at a constant speed.

When the developing unit, cleaning unit and transfer conveyance unit are turned on and off, speed fluctuations are caused in the rotational drive system. In this case, impulsive load fluctuations are caused in the rotational body, so that the rotational speed of the rotational body is sharply varied, and oscillation is caused. Further, it takes a long period of time to damp this oscillation.

In view of the aforementioned problems, the following example has been achieved. It is an object of this example to provide a drive device having the most optimal damping characteristics corresponding to the oscillation characteristics of the drive system and also having a damping means to damp oscillation quickly.

Figure 27:
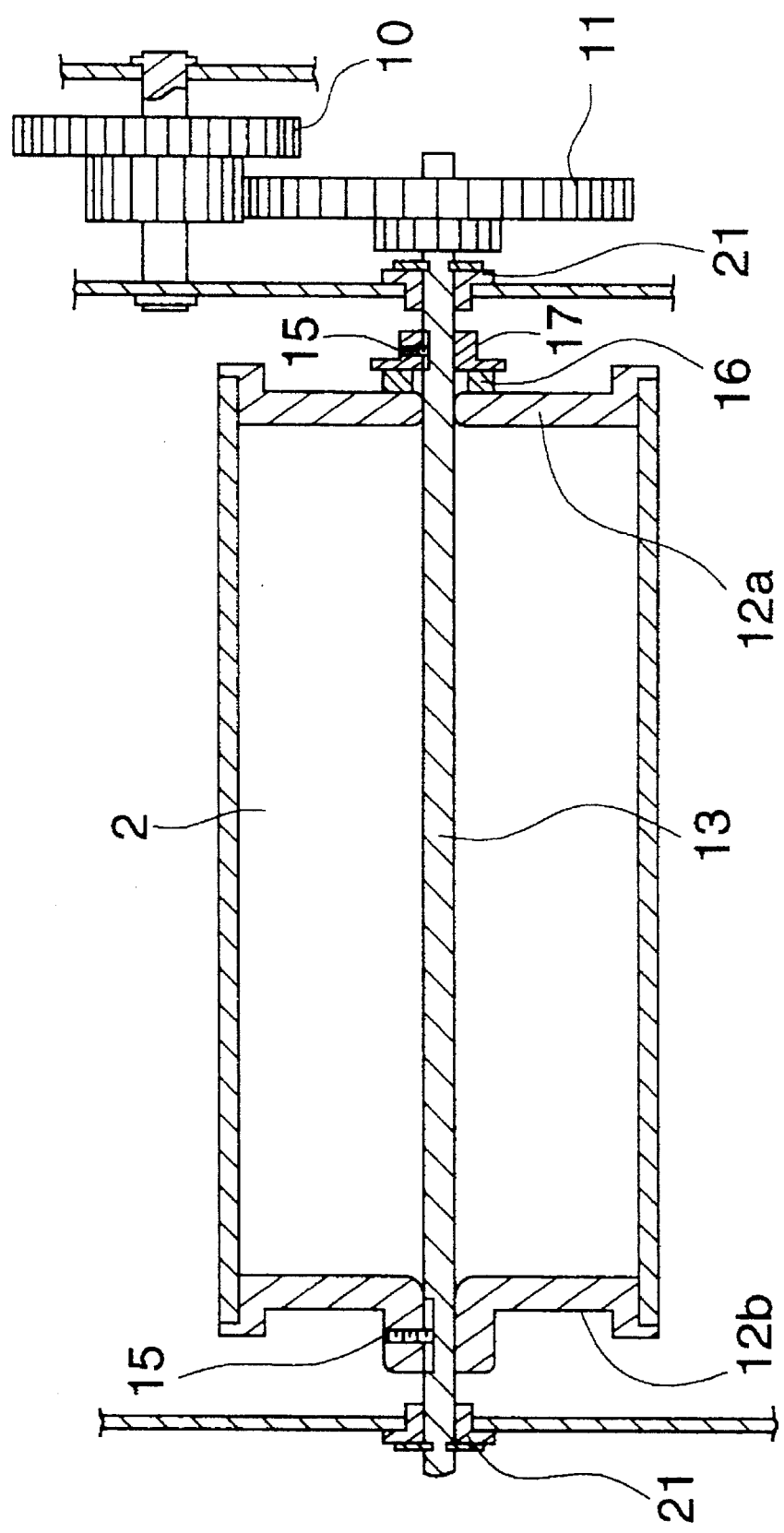
FIGS. 27 and 28 are sectional views showing an example of a photoreceptor drive shaft to which a damping member is provided.

In the example shown in FIG. 27, the flange 12a on the drive gear 11 side is connected with a flange member 17 through an adhered rubber damping member 16, wherein the flange member 17 is secured to the drive shaft 13 through a pin 15. The other flange 12b is integrally secured to the drive shaft 13 by the pin 15.

As described above, the flange 12a on the drive gear 11 side is connected with the drive shaft 13 through the damping member 16, and the flange 12b on the side opposite to the drive gear 11 is secured to the drive shaft 13. Therefore, the rigidity of the rotational body drive system including the photoreceptor drum 2, drive shaft 13 and drive gear 11 is lowered. As a result of the foregoing, the proper oscillation frequency of this rotational body drive system is lowered and damped.

Figure 28:
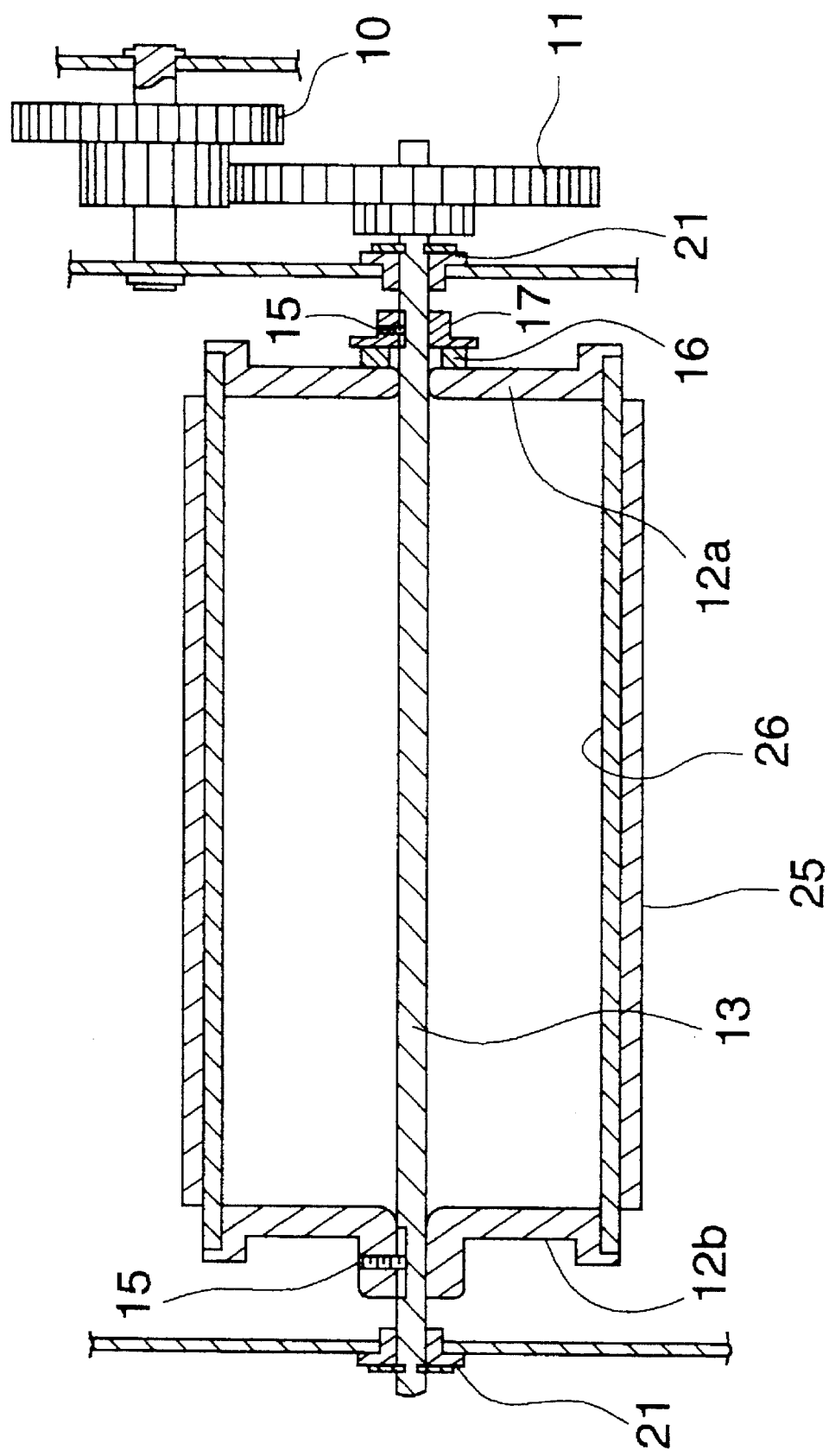

FIG. 28 shows an example in which the damping member is applied to the belt-shaped photoreceptor in the apparatus illustrated in FIG. 9. The flange 12a on the drive gear 11 side is connected with a flange member 17 through the adhered rubber damping member 16, wherein the flange member 17 is secured to the drive shaft 13 through a pin 15. In this example, the drive roller 26 can be smoothly rotated without any fluctuations of speed, so that the belt-shaped photoreceptor 25 can be rotated at a constant speed. Accordingly, the quality of outputted images can be remarkably improved.

An example will be explained here that is constituted in the following manner: the rotational body and drive shaft are connected with each other on the side far from the drive transmission system of the rotational body, and an inertia load is provided inside the rotational body so that the proper oscillation frequency can be lowered; and a dynamic damper in which the external and internal cylinders having an inertia load are connected with each other through a resilient member, is provided to the drive shaft.

Figure 29:
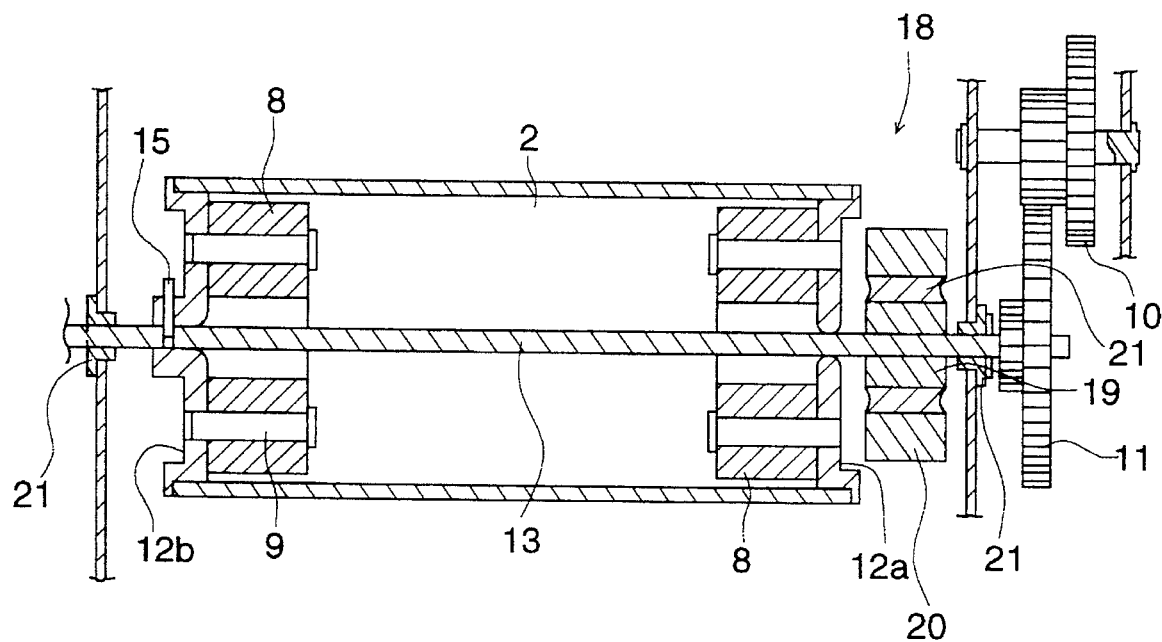
FIG. 29 is a sectional view of an example of a photoreceptor drum of the present invention to which a dynamic damper is provided.

As shown in FIG. 29, in this example, the inertia members 8 are respectively provided to the flanges 12a and 12b on both sides of the photoreceptor drum 2, and a dynamic damper 18 is provided between the photoreceptor drum 2 and the drive gear 11.

The inertia member 8 shown in FIG. 21 is a ring-shaped weight made of steel, stainless steel, brass and the like. The larger the specific gravity of the material is, the more compact the dimensions become. It is preferable that a ratio of the moment of inertia I1 of the photoreceptor drum 2 to the moment of inertial I2 of this inertia member is in a range of 0.05 to 0.4.

Figure 30:
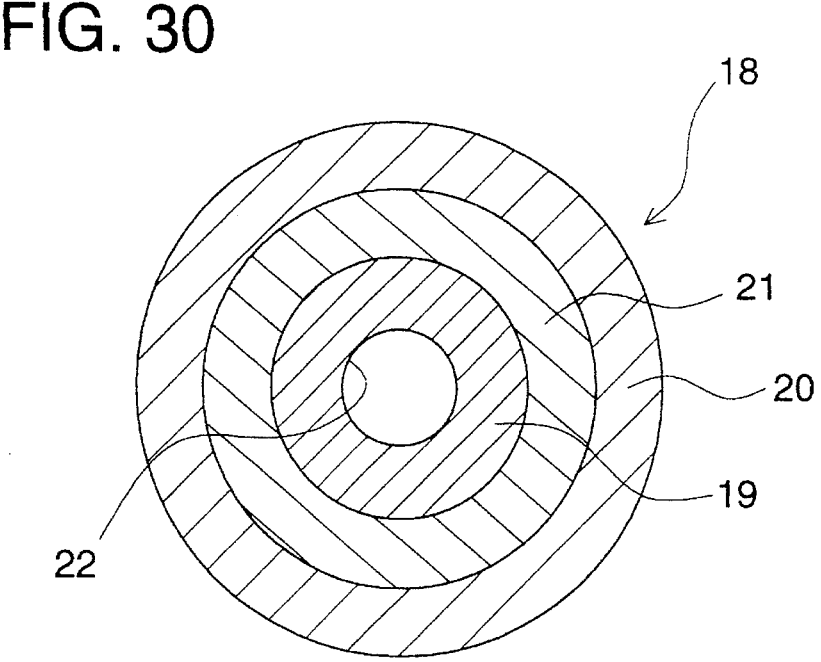
FIG. 30 is a sectional view showing a dynamic damper.

The dynamic damper 18 is shown in FIG. 30. The dynamic damper 18 is composed of an internal cylinder 19 and an external cylinder 20 provided to this internal cylinder 19. A gap formed between the internal cylinder 19 and the external cylinder 20 is provided with a resilient rubber member 21, and the drive shaft 13 is integrally secured in the central hole 22 of the inner cylinder 19. The frequency of oscillation absorbed by the dynamic damper 18 can be specified by the diameter and weight of the external cylinder and the resilience of the rubber member. Therefore, the residual oscillation of the photoreceptor drum 2 can be effectively absorbed and eliminated.

Figure 31:
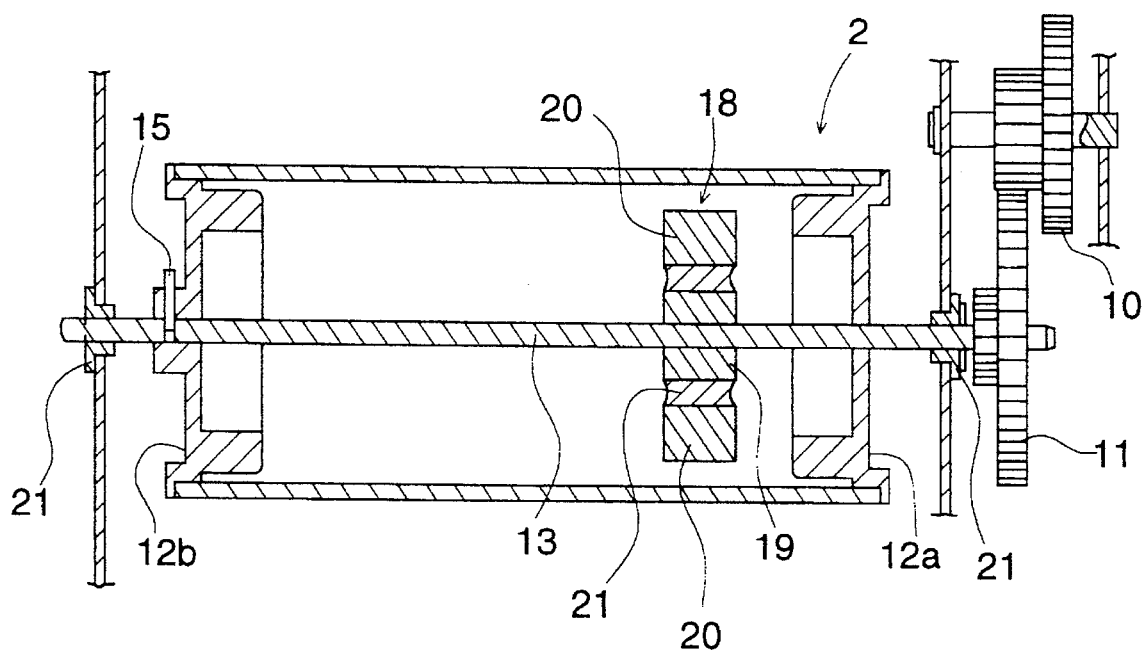
FIG. 31 is a sectional view of an example of a photoreceptor drum of the present invention to which a dynamic damper is provided.

FIG. 31 shows another example of the photoreceptor drum 2. In this example, the flanges 12a and 12b are composed of a member, the inertia load of which is heavy. In this example, the dynamic damper 18 is provided inside the photoreceptor 2, and the flange 12a can be freely rotated around the drive shaft 13. In order to increase the moment of inertia I of the drive system, the inertia load of the flange itself may be increased, and the dynamic damper 18 may not be necessarily provided in the outside of the photoreceptor drum 2. According to the aforementioned structure, the fluctuations of speed can be reduced in the same manner as the examples described above, so that the image quality can be improved, and moreover the dimensions of the apparatus can be reduced. Therefore, the assembling process can be simplified, and the cost can be reduced.

Next, an example will be explained here in which a sliding member is brought into contact with a non-image portion on the rotational body, that is, a portion that does not participate in the formation of an image.

Figure 32:
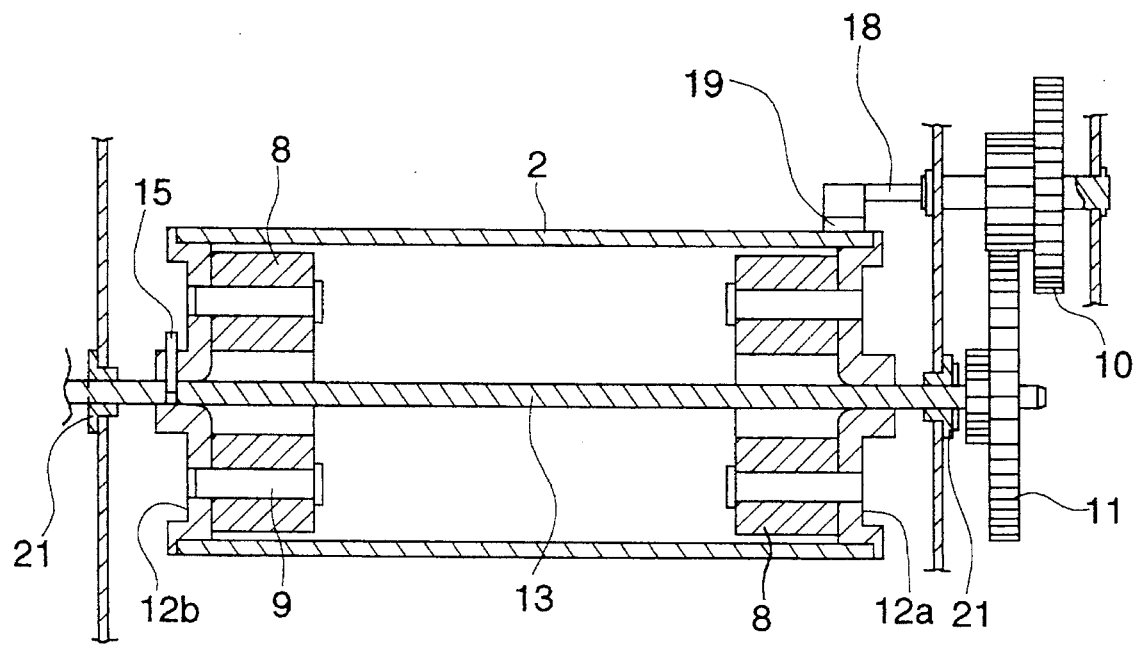
FIG. 32 is a sectional view showing an example of a photoreceptor drum of the present invention to which a sliding member is provided.
Figure 33:
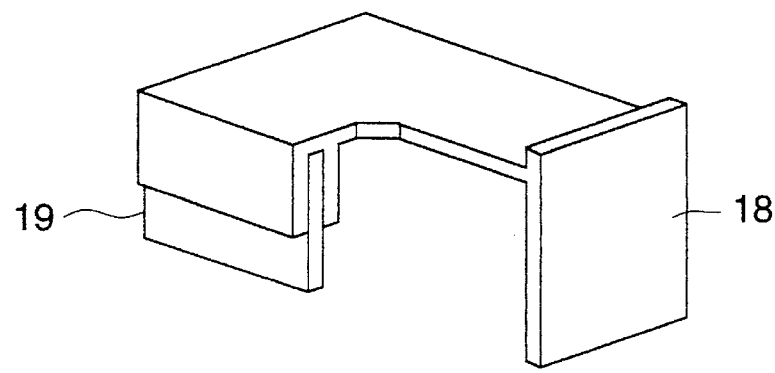
FIG. 33 is a perspective view showing a sliding member.

FIG. 33 shows a sliding member 18. A blade 19 made of silicon rubber is mounted on the tip of the sliding member 18. As shown in FIG. 32, the sliding member 18 is attached in such a manner that the blade 19 is brought into contact with the non-image portion on the surface of the photoreceptor drum 2. Since the blade 19 of the sliding member 18 comes into contact with the photoreceptor drum 2, a sliding resistance is given to the photoreceptor drum 2 when it is rotated. This sliding resistance can be appropriately set when the pushing force of the blade 19 is adjusted or the material of the blade 19 is selected.

Generally, the transfer function G(s) of oscillation is expressed by the following equation.

[EQUATION 2]

$$G(s) = \frac{\omega_N^2}{S^2 + 2\zeta\omega_N S + \omega_N^2}$$

Where $\zeta$ is an attenuation coefficient, and $\omega_N$ is the proper oscillation frequency. From Equation 2, when an damping coefficient $\zeta$ is increased, the transfer function G(s) is decreased.

FIGS. 35 to 38 show the difference between attenuation conditions when the damping coefficient $\zeta$ is changed. An axis of ordinates in each drawing indicates an amplitude, and an axis of abscissas indicates time. The damping coefficients $\zeta$ are 10% in FIG. 35, 20% in FIG. 36, 40% in FIG. 37, and 60% in FIG. 38. As a result of the foregoing, it can be found that the damping coefficient $\zeta$ is preferably within 20 to 60%. For an example, when the blade 19 was made of a rubber material, the brand name of which is HANENITE manufactured by Naigai Rubber Industry, damping coefficient $\zeta$ was 18 to 35%.

In this example, the sliding member 18 is brought into contact with the photoreceptor drum 2, so that the damping coefficient $\zeta$ of the photoreceptor drum 2 is increased. Therefore, for example, even in the case where the cleaning blade is brought into contact with the photoreceptor drum 2 and an instantaneous speed fluctuation is caused, the fluctuation can be quickly damped so that the speed is returned to the original value. In this manner, the speed fluctuation can be maintained to be minimum.

Figure 34:
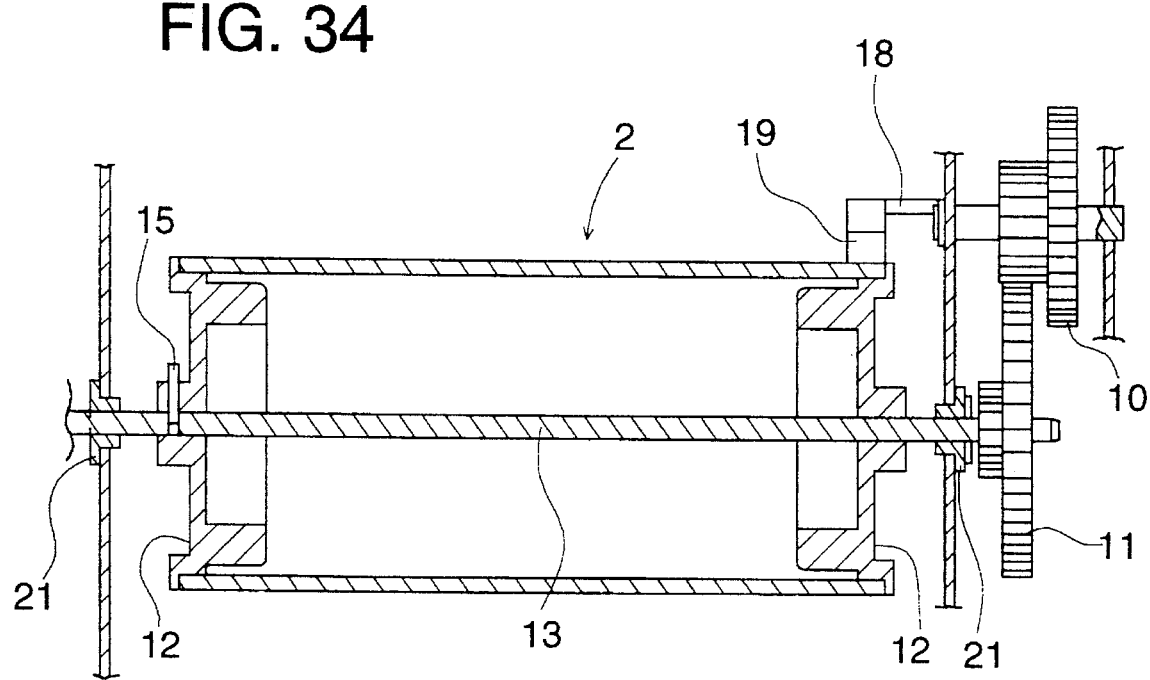
FIG. 34 is a sectional view showing an example of a photoreceptor drum of the present invention to which a sliding member is provided.
Figure 35:
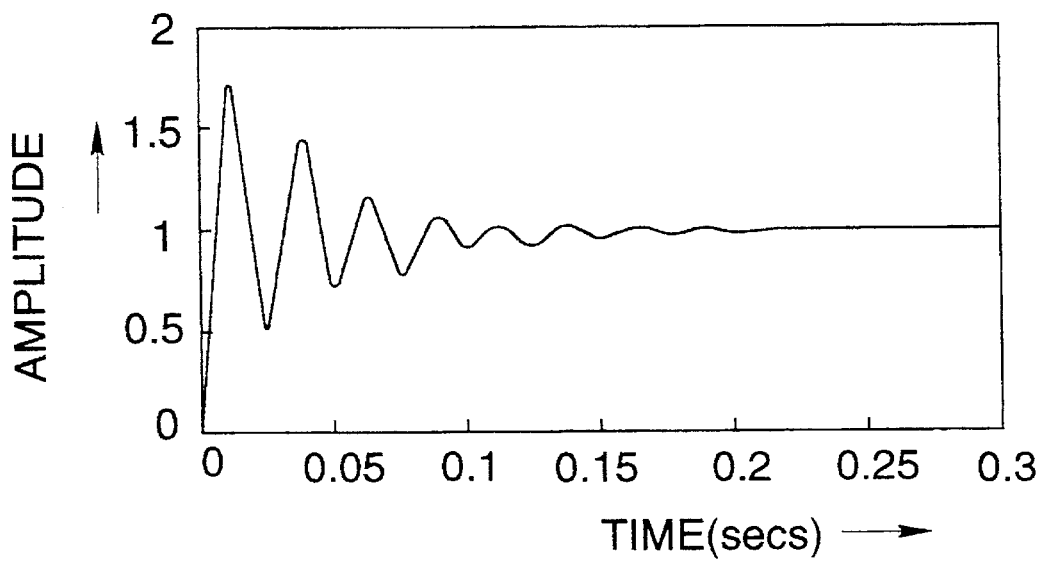
FIGS. 35 to 38 are graphs showing circumstances in which oscillation is damped.
Figure 36:
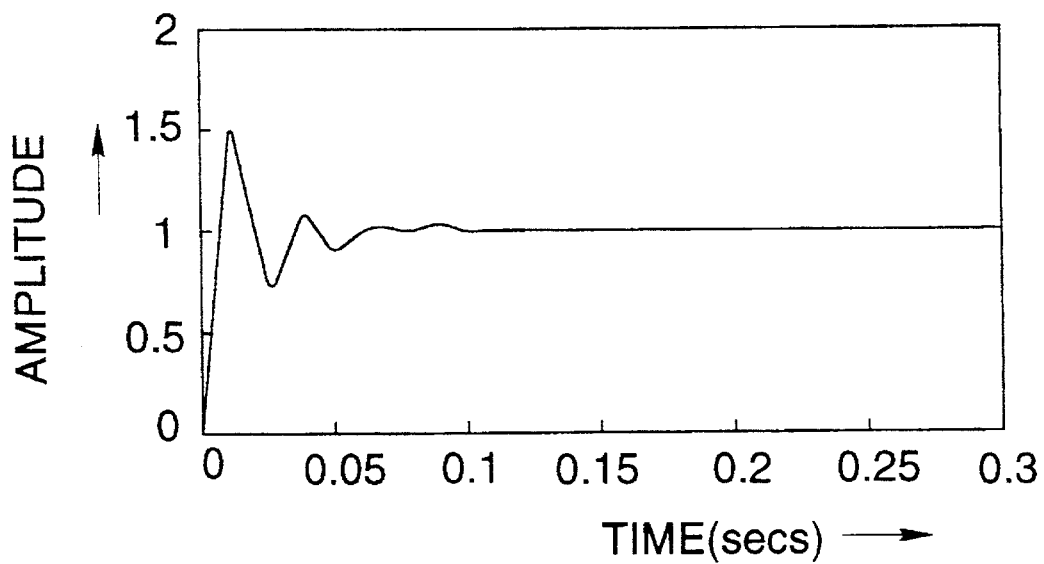
Figure 37:
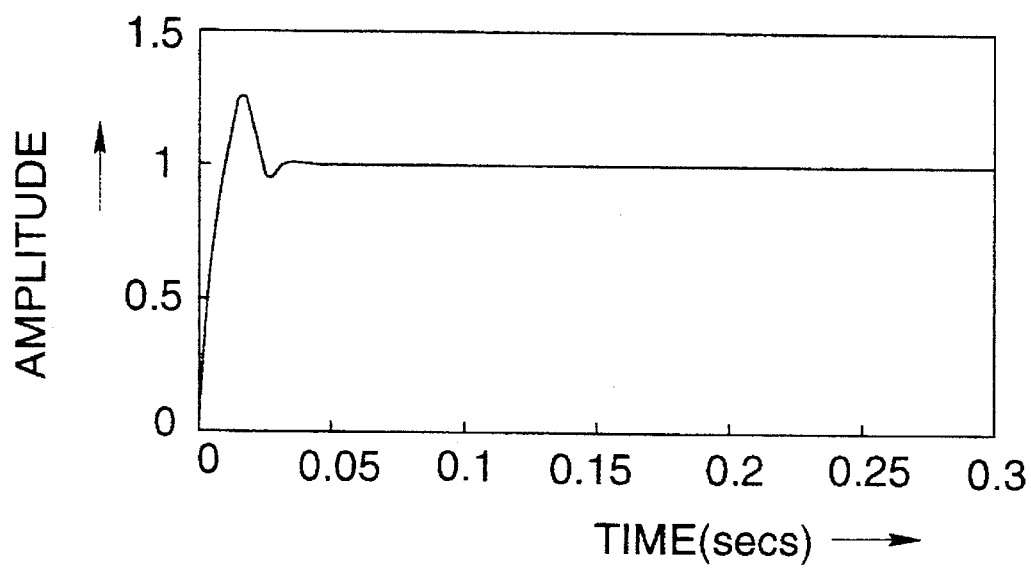
Figure 38:
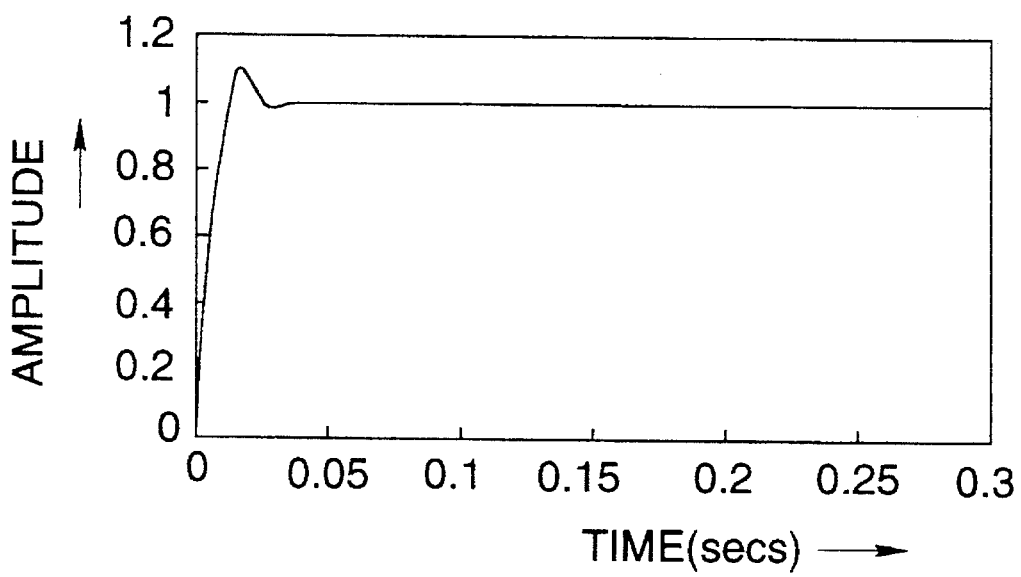

FIG. 34 shows another example of the photoreceptor drum 2. In this example, the flange 12 is composed of a member, the inertia load of which is heavy. In order to increase the moment of inertia I of the drive system, the inertia load of the flange itself may be increased as described above. As a result of the foregoing, the fluctuations of speed can be reduced, so that the image quality can be improved in the same manner as described before, and the assembling process can be simplified, and moreover, the number of parts can be reduced. As a result, the cost can be reduced.

The sliding member 18 may not be contacted with the side surface of the photoreceptor drum 2, but may be directly contacted with the flange 12. Also, the blade made of rubber may not be used for the tip of the sliding member 18, but a pad made of, for example, a planted bristle member or a piece of non-woven cloth may be used for the tip of the sliding member 18.

Next, an embodiment will be explained as follows, in which the natural frequency of the rotational drive system is shifted to the higher frequency side.

Figure 39:
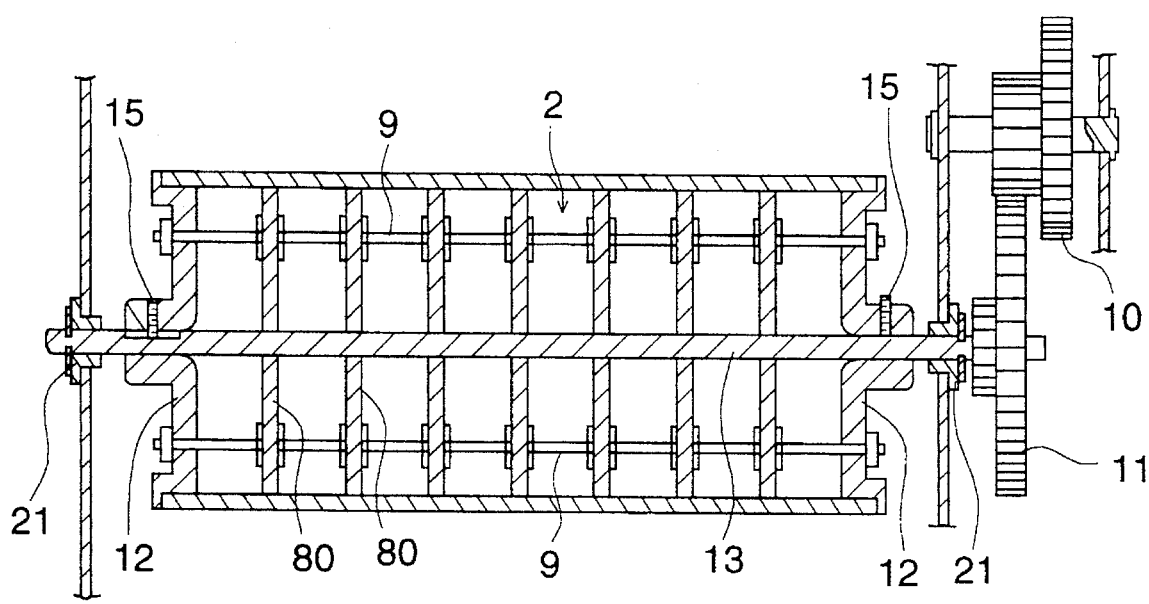
FIG. 39 is a sectional view showing an example of the photoreceptor drum of the present invention.
Figure 40:
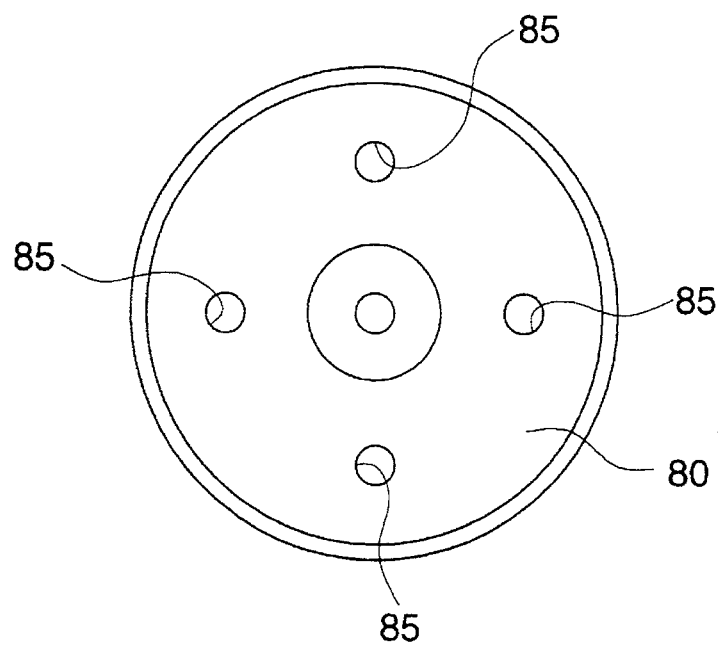
FIG. 40 is a sectional view showing still another example of the photoreceptor drum.

The construction of this embodiment is the same as that shown in FIGS. 1, 8 and 9. The photoreceptor drum 2 is made of a cylindrical member of aluminum. As illustrated in FIG. 39, flanges 12 are provided at both edges of the photoreceptor drum 2, and the lateral surface is coated with organic photosensitive material. The drive shaft 13 is fixed at a center of the flange 12 through a pin 15. This drive shaft 13 is rotatably supported by the bearing 21, and the aforementioned drive gear 11 is attached to the shaft end. This drive shaft 11 is meshed with the final gear 10. Inside the photoreceptor drum 2, the disk-shaped reinforcement members 80 shown in FIG. 40 are provided in parallel with the flange 12. These reinforcement members 80 are fixed to both the drive shaft 13 and the inner surface of the photoreceptor drum 2. Connecting rods 9 are inserted into the holes 85 formed in the reinforcement members 80. Therefore, the reinforcement members 80 are connected with each other through the connecting rods 9.

Since the reinforcement members 80 are provided inside the photoreceptor drum 2, the rigidity K in the rotational direction of the photoreceptor drum 2 is increased. As a result, the natural frequency of the drive system is increased. Accordingly, when the natural frequency is set at an appropriate value, the natural frequency and the variable components generated in the drive mechanism 4 can be separated from each other. Accordingly, the occurrence of resonance of the photoreceptor drum 2 can be prevented, and the image quality can be remarkably enhanced without the fluctuation of rotational speed of the photoreceptor drum 2.

Figure 41:
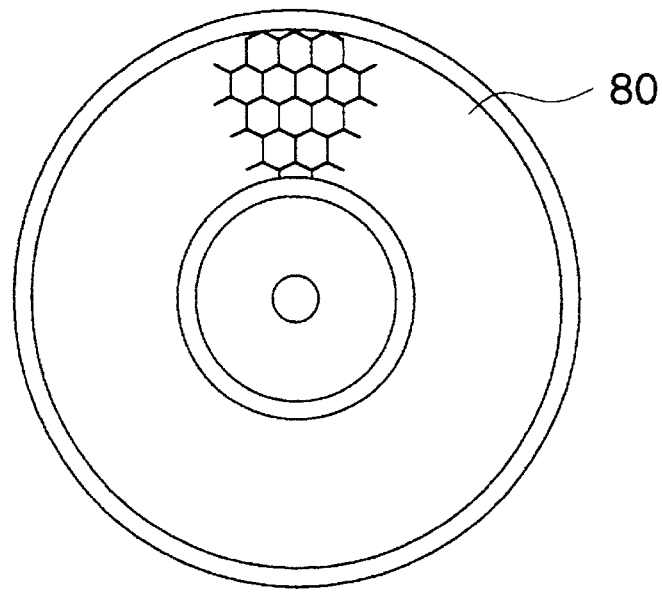
FIG. 41 is a sectional view showing still another example of the photoreceptor drum.

FIG. 41 shows another example of the photoreceptor drum 2. In this example, the reinforcement member 80 is formed into a honeycomb-shape.

These reinforcement members 80 are provided in an entire space inside the photoreceptor drum 2. These reinforcement members 80 are fixed to the drive shaft 13 and the inside of the photoreceptor drum 2 with adhesive, so that the reinforcement members 80 are closely contacted with the inside of the photoreceptor drum 2. Due to the foregoing construction of the reinforcement members 80, the rigidity K of the photoreceptor drum 2 can be increased in the same manner as described before, so that the natural frequency can be increased. As a result of the foregoing, the natural frequency and the variable components are separated from each other, so that the occurrence of resonance can be prevented. Therefore, the fluctuation of the photoreceptor drum 2 speed can be reduced and the image quality can be remarkably enhanced.

Figure 42:
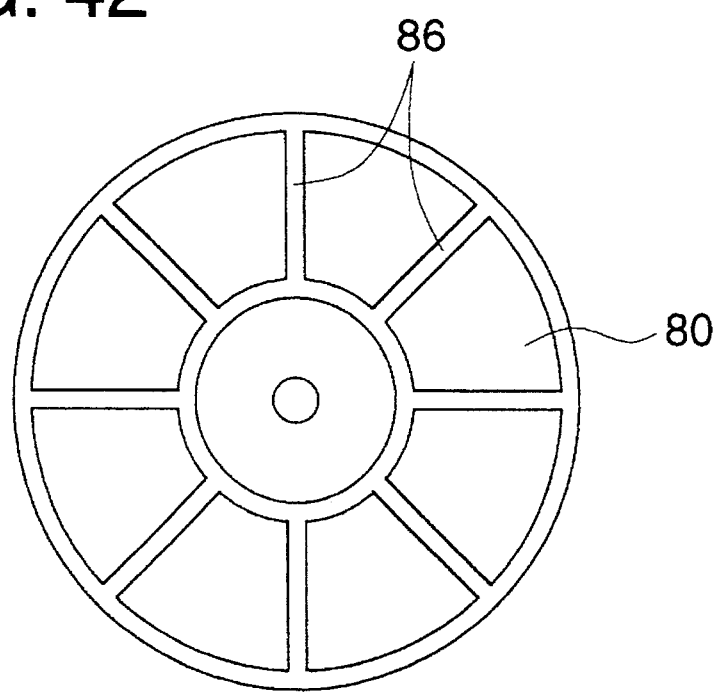
FIG. 42 is a sectional view showing still another example of the photoreceptor drum.

FIG. 42 shows another example. In this example, the reinforcement member 80 is not formed into a disk-shape, but ribs 86 are radially provided inside the photoreceptor drum 2. These ribs 86 are manufactured by extrusion molding of aluminum. When the reinforcement members 80 are formed into a rib-shape as described above, the rigidity K of the photoreceptor drum 2 can be enhanced, and further an increase in the weight can be reduced. Accordingly, in the same manner as described before, the fluctuation of photoreceptor speed can be reduced, and the image quality can be enhanced.

In the same manner as the second or third example, concerning the drive roller 26, the reinforcement members 80 may be formed into a honeycomb-shape or a rib-shape. In this case, the same effect as described before can be provided.

As described above, according to the example, the reinforcement members 80 are provided inside the photoreceptor drum 2, the rigidity of the drive system can be increased and the natural frequency can be enhanced. Therefore, the natural frequency does not coincide with the frequency of the speed variation transmitted to the drive system. As a result, the occurrence of resonance of the photoreceptor drum 2 or the drive roller 26 can be prevented, so that the photoreceptor drum 2 or the photoreceptor 25 can be rotated or conveyed at a constant speed without causing the fluctuation of speed. As a result, the image quality can be remarkably enhanced. Further, it is possible to downsize the apparatus and reduced the equipment cost, and the reliability of the entire system can be remarkably enhanced.

In the above examples, the photoreceptor drum is used. However, the present invention may be applied to a construction in which the photoreceptor belt 25 is used and driven by the drive roller 26. In this case, the rigidity of this drive roller 26 is increased by the construction of the invention.

When the construction of the invention is applied, the drive roller 26 can be rotated without the fluctuation of speed, so that the photoreceptor belt 25 can be conveyed at a constant speed. Therefore, the quality of an outputted image can be remarkably enhanced.

According to the rotational body drive unit of the present invention, the occurrence of resonance of the rotational body can be prevented and the rotational body can be rotated without the fluctuation of speed in the following manner:

In the drive system including a drive shaft driven by a drive motor and also including a rotational body connected with this drive shaft so as to be rotated at a constant speed, the rigidity of the rotational body is increased so that the natural frequency of this drive system is increased. Therefore, the natural frequency is permitted not to coincide with the frequency of the variable component generated by the rotation of the drive motor and the gear connected to the motor.

As a result, unevenness of the image referred to as step-like unevenness and pitch-like unevenness can be reduced, and the image quality can be remarkably enhanced. Further, the conventional large and complicated apparatus can be made compact, so that the equipment cost can be reduced. Since the mechanism is simplified, the reliability of the entire system can be remarkably enhanced.

In the apparatus shown in FIG. 16, the flange 12a on the drive gear 11 side is rotatably attached to the drive shaft 13, and the drive gear 11 is connected to the drive shaft 13 through the flange 12b located to a distant side. However, in this embodiment the flange 12a and the drive shaft 13 must be connected on the drive gear 11 side.

Due to the foregoing, compared with the case in which the drive gear 11 and the drive shaft 13 are connected through the flange 12b on the distant side, the rigidity of the rotational body drive system composed of the photoreceptor drum 2, drive shaft 13 and drive gear 11 is made to be high, so that the natural frequency of the rotational body drive system can be increased.

In the apparatus shown in FIG. 19, the diameter of a portion of the drive shaft 13 is made small, however, in this embodiment, the diameter of a portion or all of the drive shaft 13 must be made large.

Due to the foregoing, the rigidity of the rotational body drive system composed of the photoreceptor drum 2, drive shaft 13 and drive gear 11 can be increased, so that the natural frequency of the rotational body drive system can be increased.

According to the construction shown in FIGS. 32, 33 and 34, the sliding member 18 is provided. In this embodiment, it is possible to adopt the sliding member in the same manner.

Two embodiments of the present invention are explained above. In the case where the natural frequency of the drive system is shifted to a higher frequency side by increasing the rigidity of the photoreceptor drum, and also in the case where the natural frequency of the drive system is shifted to a lower frequency side by decreasing the rigidity of the photoreceptor drum, the natural frequency of the drive system does not coincide with the frequency of speed variation transmitted to the drive system, so that the occurrence of resonance can be avoided. In this way, it becomes possible to rotate the photoreceptor drum without generating speed variation.

Due to the foregoing, the quality of an outputted image can be remarkably enhanced.

What is claimed is:

1. An apparatus in an image forming device, for rotating a rotation member having a given length in an axial direction, comprising:

a shaft provided at an axis of said rotation member, for rotating said rotation member, said rotation member and said shaft constituting a driven system;

a driving source;

a transmitting member for transmitting a driving force from said driving source to said shaft, said transmitting member including tooth members engaging with each other to transmit driving force, said driving source and said transmitting member constituting a driving system; and said driven system and said driving system being constructed whereby a natural frequency of said driven system is lower than a frequency of a primary variable component under 150 Hz or is higher than said frequency of said primary variable component under 150 Hz, wherein said frequency of said primary component is caused per one rotation of said driving system and per engagement of one tooth of each of said tooth members.

2. The apparatus of claim 1, wherein torsional stiffness of said driven system is made higher whereby said natural frequency of said driven system is higher than said fluctuation components.

3. The apparatus of claim 1, wherein said rotation member is a photoreceptor drum.

4. The apparatus of clam 1, wherein said rotation member is a driving roller which rotates a belt-type photoreceptor.

5. The apparatus of claim 1, wherein said rotation member has a first end portion and a second end portion on an axis, said shaft passes between said first and second end portion in said rotation member along said axis of said rotation member, said driving system is disposed on a side of said first end portion of said rotation member, and said shaft and said rotation member are not fixed to each other on said second end portion and are fixed to each other on said first end portion.

6. The apparatus of claim 1, wherein a part of said shaft has a thicker diameter than other portions of said shaft.

7. The apparatus of claim 1, further comprising a damping member for damping a rotational fluctuation, wherein said damping member contacts a part of said rotation member.

8. The apparatus of claim 7, wherein said damping member is a blade member.

9. The apparatus of claim 1, wherein a disk-shaped reinforcing member is provided in said rotation member, and said reinforcing member is fixed to an inside of said rotation member and said shaft.

10. The apparatus of claim 1, wherein a honeycomb-shape member is provided in said rotation member.

11. The apparatus of claim 1, wherein a rib-shape reinforcing member is provided in said rotation member, and said rib-shape member is extended radially on said shaft.

\* \* \* \* \*